US009714338B2

(12) United States Patent
Tamaki et al.

(10) Patent No.: US 9,714,338 B2
(45) Date of Patent: Jul. 25, 2017

(54) METHOD FOR MANUFACTURING POLYMER COMPOSITION AND THE POLYMER COMPOSITION

(71) Applicant: BRIDGESTONE CORPORATION, Chuo-ku, Tokyo (JP)

(72) Inventors: Satoru Tamaki, Tokyo (JP); Shojiro Kaita, Tokyo (JP); Junko Matsushita, Tokyo (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 72 days.

(21) Appl. No.: 14/410,843

(22) PCT Filed: Jul. 11, 2013

(86) PCT No.: PCT/JP2013/004299
§ 371 (c)(1),
(2) Date: Dec. 23, 2014

(87) PCT Pub. No.: WO2014/010249
PCT Pub. Date: Jan. 16, 2014

(65) Prior Publication Data
US 2015/0197630 A1 Jul. 16, 2015

(30) Foreign Application Priority Data

Jul. 12, 2012 (JP) .................. 2012-156913
Jul. 12, 2012 (JP) .................. 2012-156914

(51) Int. Cl.
*C08F 2/04* (2006.01)
*C08L 47/00* (2006.01)
*C08F 36/08* (2006.01)
*C08L 9/00* (2006.01)
*B60C 1/00* (2006.01)
*C08L 25/06* (2006.01)

(52) U.S. Cl.
CPC ............... *C08L 47/00* (2013.01); *B60C 1/00* (2013.01); *B60C 1/0016* (2013.04); *C08F 36/08* (2013.01); *C08L 9/00* (2013.01); *C08L 25/06* (2013.01); *C08L 2205/025* (2013.01); *C08L 2314/00* (2013.01)

(58) Field of Classification Search
CPC ...... C08F 2/08; C08F 2/06; C08F 2/04; C08L 47/00; C08L 25/06
See application file for complete search history.

(56) References Cited

U.S. PATENT DOCUMENTS 4,098,980 A * 7/1978 Markle .................. C08F 36/04
525/94
4,906,706 A * 3/1990 Hattori .................. C08C 19/00
525/343
6,001,478 A * 12/1999 Apecetche ............. C08F 36/04
428/402
6,180,717 B1 1/2001 Kawazura et al.
2002/0132893 A1 9/2002 Kayser et al.
2003/0125487 A1 7/2003 Hsu et al.

FOREIGN PATENT DOCUMENTS

| CA | 2 538 377 C | 12/2010 |
| CN | 101906187 A | 12/2010 |
| EP | 0483572 A1 | 5/1992 |
| EP | 1640412 A1 | 3/2006 |
| EP | 1 394 204 B1 | 12/2007 |
| EP | 2873681 A1 | 5/2015 |
| JP | 5343539 | 11/1978 |
| JP | 60-192739 A | 10/1985 |
| JP | 01-156313 A | 6/1989 |
| JP | 01153739 A | 6/1989 |
| JP | 10-036465 A | 2/1998 |
| JP | 200212702 A | 1/2002 |
| JP | 2003-226721 A | 8/2003 |

(Continued)

OTHER PUBLICATIONS

"Highly cis-1,4 Selective Polymerization of Dienes with Homogeneous Ziegler-Natta Catalysts Based on NCN-Pincer Rare Earth Metal Dichloride Precursors" Wei Gao and Dongmei Cui J. Am. Chem. Soc., 2008, 130 (14), pp. 4984-4991 Publication Date (Web): Mar. 14, 2008.*
Communication dated Nov. 10, 2015 from the Japanese Patent Office in counterpart application No. 2012-156913.
Communication dated Nov. 24, 2015 from the Japanese Patent Office in counterpart application No. 2012-156914.
Communication dated Aug. 6, 2015 from the State Intellectual Property Office of the People's Republic of China in counterpart application No. 201380037210.1.
Database WPI, Week 1989, Jun. 15, 1989, Thomson Scientific, London, GB, XP002753250, 1 pg. total.
Yingtai J, et al. "Copolymerization of styrene with butadiene and isoprene using a rare earth catalyst", Polymer, vol. 37, No. 2, 1996, pp. 349-352.
International Search Report for PCT/JP2013/004299 dated Sep. 17, 2013.

*Primary Examiner* — Peter D Mulcahy
(74) *Attorney, Agent, or Firm* — Sughrue Mion, PLLC

(57) ABSTRACT

An object of the present invention is to provide a polymer composition having properties resembling those of natural rubber, e.g. good durability (fracture resistance, wear resistance, and crack growth resistance), and a method for manufacturing the polymer composition. Specifically, the present invention provides a method for manufacturing a polymer composition including a mixture of polyisoprene and polystyrene/polybutadiene, comprising: polymerizing styrene monomer or butadiene monomer in the presence of a catalyst to synthesize polystyrene or polybutadiene; adding isoprene monomer to the polystyrene or polybutadiene thus synthesized, to synthesize polyisoprene and thus generate said mixture, wherein content of the styrene monomer or the butadiene monomer is set to be 10 mol % or less with respect to the total quantity of the styrene monomer/the butadiene monomer and the isoprene monomer.

12 Claims, No Drawings

(56) References Cited

FOREIGN PATENT DOCUMENTS

| | | |
|---|---|---|
| JP | 2004-027179 A | 1/2004 |
| RU | 2001 104 876 A | 8/2003 |
| RU | 2 301 236 C2 | 6/2007 |
| WO | 2006/078021 A1 | 7/2006 |
| WO | 2010074255 A1 | 7/2010 |

* cited by examiner

METHOD FOR MANUFACTURING POLYMER COMPOSITION AND THE POLYMER COMPOSITION

CROSS REFERENCE TO RELATED APPLICATION

This application is a National Stage of International Application No. PCT/JP2013/004299 filed Jul. 11, 2013, claiming priority based on Japan Patent Application Nos. 2012-156913 filed Jul. 12, 2012 and 2012-156914 filed Jul. 12, 2012, the contents of all of which are incorporated herein by reference in their entirety.

TECHNICAL FIELD

The present invention relates to a method for manufacturing a polymer composition and the polymer composition thus manufactured.

BACKGROUND ART

There has been an increasing preference for a rubber material excellent in fracture resistance, wear resistance and crack growth resistance in recent years due to pursuit of better durability of a tire responding to social demand for saving energy and resources. Further, a recent rising price of natural rubber necessitates development of synthetic rubber having durability equivalent to that of natural rubber.

There have conventionally been attempts to improve strain-induced crystallinity of synthetic polyisoprene by increasing the cis content thereof in order to enhance durability of the polyisoprene (refer to PTL 1 and PTL 2, for example). However, use of synthetic polyisoprene as a rubber composition in place of natural rubber requires synthetic polyisoprene to be blended with other polymer components because wear resistance and fracture resistance of synthetic polyisoprene are not as high as those of natural rubber. Relevant respective polymers are therefore charged into and mixed by a mixer in general when synthetic isoprene and other polymers are mixed. There arises a problem, however, in this regard in that polymers are not dispersed in a satisfactory manner by such mixing as described above and a resulting polymer composition may not have physical properties as desired.

CITATION LIST

Patent Literature

PTL 1: JP2004-027179
PTL2: WO2006/078021

SUMMARY OF THE INVENTION

Technical Problems

An object of the present invention is to provide: a method for manufacturing a polymer composition, which method can manufacture a rubber composition having properties resembling those of natural rubber, e.g. good durability (fracture resistance, wear resistance, and crack growth resistance); and the polymer composition manufactured by the method. Another object of the present invention is to provide a tire using the polymer composition.

Solution to the Problems

In order to solve the problem described above, the present invention provides in a first aspect thereof a method for manufacturing a polymer composition including a mixture of polyisoprene and polystyrene/polybutadiene, comprising:

polymerizing styrene monomer or butadiene monomer in the presence of a catalyst to synthesize polystyrene or polybutadiene;

adding isoprene monomer to the polystyrene or polybutadiene thus synthesized, to synthesize polyisoprene and thus generate said mixture, wherein content of the styrene monomer or the butadiene monomer is set to be 10 mol % or less with respect to the total quantity of the styrene monomer/the butadiene monomer and the isoprene monomer.

Polystyrene/polybutadiene is highly dispersed in polyisoprene in a polymer composition manufactured by this manufacturing method. Accordingly, the polymer composition exhibits satisfactorily good workability in spite of a relatively small content of polystyrene/polybutadiene therein, while successfully retaining properties of polyisoprene resembling those of natural rubber because of the relatively small content (≤a certain value) of polystyrene/polybutadiene contained in the polymer composition. Moreover, the polymer composition as a whole exhibits improved workability due to the highly dispersed styrene/butadiene.

The present invention subsumes oligomer under the term "polymer".

The present invention provides in a second aspect thereof a method for manufacturing a polymer composition including a mixture of polyisoprene and polybutadiene, comprising:

polymerizing butadiene monomer and isoprene monomer in the presence of a catalyst to generate said mixture, wherein the butadiene monomer and the isoprene monomer are added such that content of the butadiene monomer is 10 mol % or less with respect to the total quantity of the butadiene monomer and the isoprene monomer.

Under a certain catalyst condition, butadiene monomers are preferentially polymerized when butadiene monomers and isoprene monomers coexist. On this basis, it is possible to retain properties of polyisoprene resembling those of natural rubber in a resulting polymer composition by adjusting an amount to be added, of butadiene monomer, and thus setting the content of butadiene in the polymer composition to be a predetermined limit value or less. Further, there are other advantages in this case in that: polybutadiene is highly dispersed in polyisoprene because polybutadiene and polyisoprene are generated in the same system; and the polymer composition including the mixture can be easily obtained by "one-pot" process, i.e. only one charge of the relevant monomers.

Advantageous Effect of the Invention

According to the present invention, it is possible to manufacture a rubber product having properties resembling those of natural rubber, e.g. good durability (fracture resistance, wear resistance, and crack growth resistance). Further, it is possible to provide a tire having good durability (fracture resistance, wear resistance, and crack growth resistance).

DESCRIPTION OF THE EMBODIMENTS

Polymer Composition

The polymer composition of the present invention is a polymer composition where polystyrene or polybutadiene is highly dispersed in polyisoprene.

—Styrene Content—

In the case where the polymer composition includes a mixture of polyisoprene and polystyrene, the proportion of styrene in the whole monomer units constituting the polymer composition is to be in the range of 0 mol % to 10 mol % (exclusive of 0 mol % and inclusive of 10 mol %). The proportion of styrene 10 mol % advantageously improves workability of the polymer composition without marring properties of polyisoprene resembling those of natural rubber, e.g. good durability (fracture resistance, wear resistance, and crack growth resistance). The proportion of styrene is preferably ≤5 mol %. Presence of styrene in the polymer composition is detected by using NMR (Nuclear Magnetic Resonance) or GPC (Gas Permeation Chromatography). When NMR is used, the content of styrene is determined by observing a phenyl proton of styrene in the vicinity of 7 ppm and then calculating a ratio of the detection value of styrene with respect to the detection value of isoprene. When GPC is used, a ratio of the styrene detection value (absorption at 254 nm) with respect to the isoprene detection value is calculated by utilizing an absorption peak at 254 nm of styrene.

—Number of Styrene Monomer Units and Number Average Molecular Weight of Polystyrene—

The number of styrene monomer units per one polystyrene molecule is preferably ≤10 and more preferably ≤5. The number average molecular weight per one polystyrene molecule is preferably in the range of 500 to 1000 (inclusive of 500 and 1000). Too large polystyrene polymer is likely to adversely affect good properties of polyisoprene. Good durability (fracture resistance, wear resistance, and crack growth resistance) of polyisoprene can be maintained by setting the size of polystyrene not to exceed a certain level.

—Butadiene Content—

In the case where the polymer composition includes a mixture of polyisoprene and polybutadiene, the proportion of butadiene in the whole monomer units constituting the polymer composition is to be in the range of 0 mol % to 10 mol % (exclusive of 0 mol % and inclusive of 10 mol %). The proportion of butadiene 10 mol % advantageously improves durability (fracture resistance, wear resistance, and crack growth resistance) without marring the advantageous properties of polyisoprene. Presence of butadiene in the polymer composition is detected by using $^1$H-NMR. Signals are observed in the vicinity of 5.1 ppm for 1,4 bond protons and in the vicinity of 4.7 ppm for 3,4 bond protons in polyisoprene itself. On the other hand, signals are observed in the vicinity of 5.4 ppm for 1,4 bond protons and in the vicinity of 4.8 ppm for 3,4 bond protons in polybutadiene.

In the aforementioned case, the number of butadiene monomer units per one polybutadiene molecule is preferably ≤10. The number average molecular weight per one polybutadiene molecule is preferably ≤1000. Too large polybutadiene polymer is likely to adversely affect good properties of polyisoprene. Good durability (fracture resistance, wear resistance, and crack growth resistance) of polyisoprene can be maintained by setting the size of polybutadiene not to exceed a certain level. The number average molecular weight (Mn) is determined relative to polystyrene as a standard reference material by gel permeation chromatography (GPC).

—Cis-1,4 Bond Content of Polyisoprene—

The cis-1,4 bond content of polyisoprene described above as a whole is preferably ≥95%, more preferably ≥97%, and further more preferably ≥98%. The cis-1,4 bond content ≥95% allows the polyisoprene to exhibit satisfactory strain-induced crystallinity. The cis-1,4 bond content ≥97% or 98% further advantageously improves durability due to better strain-induced crystallinity. It should be noted that "the cis-1,4 bond content" (as well as the trans-1,4 bond content and the 3,4 vinyl bond content described below) represents the relevant content in the polyisoprene and does not represent a content with respect to the polymer composition as a whole.

—Trans-1,4 Bond Content of Polyisoprene—

The trans-1,4 bond content of polyisoprene described above is not particularly limited and may be appropriately selected according to necessity but preferably ≤5%, more preferably ≤3%, and further more preferably ≤1%. The trans-1,4 bond content ≤5% allows the polyisoprene to exhibit satisfactory strain-induced crystallinity. The trans-1,4 bond content ≤3% or 1% is more advantageous in terms of improving durability by better strain-induced crystallinity.

—3,4-Vinyl Bond Content of Polyisoprene—

The 3,4-vinyl bond content of polyisoprene in the polymer composition described above is not particularly limited and may be appropriately selected according to necessity but preferably ≥5%, more preferably ≥3%, and further more preferably ≥1%. The 3,4-vinyl bond content ≤5% allows the polyisoprene to exhibit satisfactory strain-induced crystallinity. The 3,4-vinyl bond content ≤3% or 1% is more advantageous in terms of improving durability by better strain-induced crystallinity.

—1,2-Vinyl Bond Content—

The 1,2-vinyl bond content of polyisoprene in the polymer composition described above is not particularly limited and may be appropriately selected according to necessity but preferably ≤5%, more preferably ≤3%, and further more preferably ≤1%. The 1,2-vinyl bond content ≤5% allows the polyisoprene to exhibit satisfactory strain-induced crystallinity. The 1,2-vinyl bond content ≤3% or 1% is more advantageous in terms of improving durability by better strain-induced crystallinity.

—Number Average Molecular Weight—

The number average molecular weight (Mn) of the polymer composition described above is not particularly limited and may be appropriately selected according to necessity but preferably in the range of 400,000 to 2,500,000 and more preferably in the range of 500,000 to 2,500,000. Good workability of the polymer composition can be maintained by setting the molecular weight to be 2,500,000. The number average molecular weight (Mn) is determined relative to polystyrene as a standard reference material by gel permeation chromatography (GPC).

—Molecular Weight Distribution (Mw/Mn)—

The molecular weight distribution (Mw/Mn) represented by a ratio of the weight average molecular weight (Mw) with respect to the number average molecular weight (Mn) of the polymer composition described above is not particularly limited and may be appropriately selected according to necessity but preferably in the range of 1 to 5. The molecular weight distribution (Mw/Mn) is determined relative to polystyrene as a standard reference material by gel permeation chromatography (GPC).

—Method for Manufacturing Polymer Composition Including Mixture of Polyisoprene and Polystyrene—

A method for successfully manufacturing a polymer composition including a mixture of polyisoprene and polystyrene will be described in detail hereinafter. The method for manufacturing a polymer composition containing a mixture of polyisoprene and polystyrene includes at least polymerization process and optionally coupling, rinsing, and other processes which may be appropriately selected.

—Styrene Polymerization Process—

First polymerization process includes adding only styrene monomer in the presence of catalyst, without adding isoprene, to allow the styrene monomer to be polymerized. In this connection, it is possible to adjust the molecular weight of a resulting polymer by appropriately selecting an amount of styrene monomer to be added and reaction time.

A polymerization reaction in the styrene polymerization process described above is preferably carried out in an atmosphere of inert gas, preferably in an atmosphere of nitrogen or argon. The polymerization temperature in the polymerization reaction, although it is not particularly restricted, is preferably in the range of −100° C. to 200° C. and may be around the room temperature, for example. Too high polymerization temperature may adversely affect selectivity of cis-1,4 bond in the polymerization reaction. Pressure during the polymerization reaction is preferably in the range of 0.1 MPa to 10.0 MPa in terms of capturing a sufficient amount of styrene into the polymerization reaction system. Reaction time of the polymerization reaction is preferably in the range of 1 minute to 900 minutes when an oligomer having the styrene unit number 10 is to be generated but may be appropriately set depending on conditions such as type of the catalyst, polymerization temperature, and the like. The reaction time is preferably in the range of 5 minutes to 300 minutes when the reaction temperature is in the range of 25° C. to 80° C.

—Isoprene Polymerization Process—

Second polymerization process includes adding isoprene monomer to a product of the styrene polymerization reaction described above to allow the isoprene monomer to be polymerized. In a case of using a catalyst described below, in particular, the polymerization reaction easily shifts from styrene polymerization to isoprene polymerization due to the properties of the catalyst, thereby advantageously facilitating generation of polyisoprene at sites very close to polystyrene. That is, polyisoprene molecules exist in the vicinities of polystyrene molecules at a stage of the polymerization reaction in this case, which is likely to cause the polystyrene to be highly dispersed on a micro level in the polyisoprene generated by the polymerization reaction.

The isoprene polymerization process described above is preferably carried out in an atmosphere of inert gas, preferably in an atmosphere of nitrogen or argon. The polymerization temperature in the polymerization reaction, although it is not particularly restricted, is preferably in the range of −100° C. to 200° C. and may be around the room temperature, for example. Too high polymerization temperature may adversely affect selectivity of cis-1,4 bond in the polymerization reaction. Pressure during the polymerization reaction is preferably in the range of 0.1 MPa to 10.0 MPa in terms of capturing a sufficient amount of isoprene into the polymerization reaction system. Reaction time of the polymerization reaction, although it is not particularly restricted, is preferably in the range of 1 second to 10 days, for example. The reaction time may be appropriately set depending on conditions such as type of the catalyst, polymerization temperature, and the like.

The polymerization reaction can be stopped by using a polymerization terminator such as methanol, ethanol, isopropanol in the isoprene polymerization process described above.

—Method for Manufacturing Polymer Composition Including Mixture of Polyisoprene and Polybutadiene—

A method for successfully manufacturing a polymer composition including a mixture of polyisoprene and polybutadiene will be described in detail hereinafter. The method for manufacturing a polymer composition containing a mixture of polyisoprene and polybutadiene includes at least polymerization process and optionally coupling, rinsing, and other processes which may be appropriately selected.

—First Polymerization Reaction Method—

The polymerization process in the method for manufacturing a polymer composition containing a mixture of polyisoprene and polybutadiene is carried out by either first polymerization reaction method or second polymerization reaction method. The first polymerization reaction method includes: adding at first only a small amount of butadiene monomer in the presence of catalyst, without adding isoprene, to allow the butadiene monomer to be polymerized; then adding a large amount of isoprene to a polymer or an oligomer thus generated by polymerization of the butadiene monomer, to allow the isoprene to be polymerized.

—Polymerization Method—

Any polymerization method such as solution polymerization, suspension polymerization, liquid-phase bulk polymerization, emulsion polymerization, vapor-phase polymerization, or solid-phase polymerization can be used as a polymerization method in the first/second polymerization reaction method. Any solvent can be used when a solvent is to be used in the polymerization reaction as long as the solvent is inactive in the polymerization reaction. Examples of such a solvent as described above include toluene, cyclohexane, n-hexane, and a mixture thereof.

—Butadiene Polymerization Method—

In the first polymerization reaction method, it is preferable that at first only butadiene monomer is added in the presence of catalyst without addition of isoprene, so that the butadiene monomer is polymerized. In this connection, it is possible to adjust the molecular weight of a resulting polymer oligomer by appropriately selecting an amount of butadiene monomer to be added and reaction time.

The polymerization reaction in the butadiene polymerization process described above is preferably carried out in an atmosphere of inert gas, preferably in an atmosphere of nitrogen or argon. The polymerization temperature in the polymerization reaction, although it is not particularly restricted, is preferably in the range of −100° C. to 200° C. and may be around the room temperature, for example. Too high polymerization temperature may adversely affect selectivity of cis-1,4 bond in the polymerization reaction. Pressure during the polymerization reaction is preferably in the range of 0.1 MPa to 10.0 MPa in terms of capturing a sufficient amount of butadiene into the polymerization reaction system. Reaction time of the polymerization reaction is preferably in the range of 1 minute to 900 minutes when an oligomer having the butadiene unit number 10 is to be generated but may be appropriately set depending on conditions such as type of the catalyst, polymerization temperature, and the like. The reaction time is preferably in the range of 5 minutes to 300 minutes when the reaction temperature is in the range of 25° C. to 80° C.

—Isoprene Polymerization Process—

Next, it is preferable that isoprene monomer is added by an amount at least nine times as much as the amount (mol) of butadiene to a product of the butadiene polymerization reaction described above, so that the isoprene monomer is polymerized. The isoprene monomer added by a large amount advantageously competes with the butadiene monomer, thereby bringing about a situation where the isoprene monomer can be easily reacted. Further, the catalyst used for generation of polybutadiene is then used for generation of polyisoprene in this case, thereby facilitating generation of polyisoprene at sites close to polybutadiene. That is, polyisoprene molecules exist in the vicinities of polybutadiene molecules at a stage of the polymerization reaction, which is likely to cause the polybutadiene to be highly dispersed on a micro level in the polyisoprene generated by the polymerization reaction.

The polymerization reaction is preferably carried out in an atmosphere of inert gas, preferably in an atmosphere of nitrogen or argon in the isoprene polymerization process described above. The polymerization temperature in the polymerization reaction, although it is not particularly restricted, is preferably in the range of −100° C. to 200° C. and may be around the room temperature, for example. Too high polymerization temperature may adversely affect selectivity of cis-1,4 bond in the polymerization process. Pressure during the polymerization reaction is preferably in the range of 0.1 MPa to 10.0 MPa in terms of capturing a sufficient amount of isoprene into the polymerization reaction system. Reaction time of the polymerization reaction, although it is not particularly restricted, is preferably in the range of 1 second to 10 days, for example. The reaction time may be appropriately set depending on conditions such as type of the catalyst, polymerization temperature, and the like.

The polymerization reaction can be stopped by using a polymerization terminator such as methanol, ethanol, isopropanol in the isoprene polymerization process described above.

—Second Polymerization Reaction Method—

Examples of another embodiment of the polymerization reaction method in the method for manufacturing a polymer composition containing a mixture of polyisoprene and polybutadiene include adding butadiene monomer and isoprene monomer together in the presence of catalyst to allow them to be polymerized. In a case where a polymerization catalyst composition described below is used, in particular, the butadiene monomer is characteristically more reactive than isoprene monomer and therefore the butadiene monomer tends to be polymerized more quickly than the isoprene monomer when these two types of monomers coexist in the same reaction system. However, as the polymerization reaction proceeds and an amount of the remaining butadiene monomer is scarce, the isoprene monomer competes with the small amount of butadiene monomer and is more likely to be polymerized. Moreover, generation of polybutadiene and generation of polyisoprene are carried out at sites very close to each other because the butadiene monomer and the isoprene monomer are added simultaneously. As a result, the polybutadiene is likely to be highly dispersed on a micro level in the polyisoprene generated by the polymerization reaction.

—Polymerization Method—

Any polymerization method such as solution polymerization, suspension polymerization, liquid-phase bulk polymerization, emulsion polymerization, vapor-phase polymerization, or solid-phase polymerization can be used as a polymerization method in the second polymerization reaction method. Any solvent can be used when a solvent is to be used in the polymerization reaction as long as the solvent is inactive in the polymerization reaction. Examples of such a solvent as described above include toluene, cyclohexane, n-hexane, and a mixture thereof.

—Polymerization Process—

In the second polymerization reaction method, butadiene monomer and isoprene monomer are added substantially at the same time in the presence of catalyst, so that these monomers are polymerized, respectively. In this connection, an amount (mol) of butadiene monomer to be added is 10% or less with respect to the total quantity (mol) of the butadiene monomer and the isoprene monomer. It is possible to adjust the number of butadiene monomer units of a butadiene block at a terminal end of the polymer composition thus generated, as well as the molecular weight of the butadiene block, by changing the proportion of the butadiene monomer to be blended.

The polymerization reaction in the polymerization process described above is preferably carried out in an atmosphere of inert gas, preferably in an atmosphere of nitrogen or argon gas. The polymerization temperature in the polymerization reaction, although it is not particularly restricted, is preferably in the range of −100° C. to 200° C. and may be around the room temperature, for example. Too high polymerization temperature may adversely affect selectivity of cis-1,4 bond in the polymerization reaction. Pressure during the polymerization reaction is preferably in the range of 0.1 MPa to 10.0 MPa in terms of capturing a sufficient amount of butadiene into the polymerization reaction system. Reaction time of the polymerization reaction, although it is not particularly restricted, is preferably in the range of 1 second to 10 days, for example. The reaction time may be appropriately set depending on conditions such as type of the catalyst, polymerization temperature, and the like. Specifically, the reaction time is preferably in the range of 1 minute to 900 minutes when an oligomer having the butadiene unit number ≤10 is to be generated but this reaction time may be appropriately set depending on conditions such as type of the catalyst, polymerization temperature, and the like. The reaction time is preferably in the range of 5 minutes to 300 minutes when the reaction temperature is in the range of 25° C. to 80° C.

The polymerization reaction can be stopped by using a polymerization terminator such as methanol, ethanol, isopropanol in the polymerization process described above.

—Polymerization Catalyst Composition—

Each of the styrene polymerization, butadiene polymerization, and isoprene polymerization processes described above preferably includes a process of polymerizing the relevant monomer in the presence of any of a polymerization catalyst, a first polymerization catalyst composition, a second polymerization catalyst composition, and a third polymerization catalyst composition described below.

—First Polymerization Catalyst Composition—

The first polymerization catalyst composition will be described hereinafter.

The first polymerization catalyst composition is made up of component (A): a rare earth element compound or a reactant resulted from a reaction between the rare earth element compound and a Lewis base, wherein the rare earth element compound and the reactant thereof have no bond between a relevant rare earth metal and a carbon atom, respectively, and component (B): at least one type of compound selected from the group consisting of (B-1) an ionic compound constituted of a non-coordinating anion and a cation, (B-2) aluminoxane, and (B-3) at least one type of halogen compound selected from a Lewis acid, a complex compound of a metal halide and a Lewis base, and an organic compound containing an active halogen.

In a case where the first polymerization catalyst composition includes at least one of the ionic compound (B-1) and the halogen compound (B-3), the first polymerization catalyst composition further includes component (C) which is an organic metal compound represented by the following formula (X):

$$YR^1_a R^2_b R^3_c \quad (X)$$

(In formula (X), Y represents a metal selected from the group 1, 2, 12 and 13 elements in the periodic table, $R^1$ and $R^2$ each represent a $C_{1-10}$ hydrocarbon group or a hydrogen atom and may be of either the same type or different types, $R^3$ represents a $C_{1-10}$ hydrocarbon group and may be of either the same type as or a different type from $R^1$ and $R^2$, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.)

The ionic compound (B-1) and the halogen compound (B-3) need the component (C) serving as a carbon donor to the component (A) because neither the ionic compound (B-1) nor the halogen compound (B-3) has a carbon atom which can be supplied to the component (A). The first polymerization catalyst composition may include the component (C) in a case where the catalyst composition includes the aluminoxane (B-2). Further, the first polymerization catalyst composition may include other components included in a conventional rare-earth element compound-based polymer catalyst composition, e.g. a prompter.

Content of the component (A) contained in the first polymerization catalyst composition is preferably in the range of 0.1 mol/l to 0.0001 mol/l in the polymerization reaction system.

Further, the first polymerization catalyst composition preferably includes an additive D which can serve as an anionic ligand.

The component (A) for use in the first polymerization catalyst composition is a rare earth element compound or a reactant resulted from a reaction between the rare earth element compound and a Lewis base, wherein the rare earth element compound and the reactant thereof have no bond between a relevant rare earth metal and a carbon atom, respectively. A rare earth element compound or a reactant resulted from a reaction between the rare earth element compound and a Lewis base, having no bond between a relevant rare earth metal and a carbon atom, is stable as a compound and easy to handle. In the present invention, a "rare earth element compound" represents a compound containing: one of lanthanoid elements constituted of atomic number 57-71 elements in the periodic table; or scandium or yttrium.

Specific examples of the lanthanoid elements include lanthanum, cerium, praseodymium, neodymium, promethium, samarium, europium, gadolinium, terbium, dysprosium, holmium, erbium, thulium, ytterbium, and lutetium.

Either a single type or combination of two or more types of the aforementioned examples or the like may be used as the compound (A).

The rare earth element compound described above is preferably a salt or a complex compound containing a divalent/trivalent rare earth metal and more preferably a rare earth element compound having at least one type of ligand selected from hydrogen atom, halogen atom, and an organic compound residue. Further, the rare earth element compound or the reactant resulted from a reaction between the rare earth element compound and a Lewis base is represented by following general formula (XI) or general formula (XII):

$$M^{11}X^{11}_2 \cdot L^{11}_w \quad (XI)$$

$$M^{11}X^{11}_3 \cdot L^{11}_w \quad (XII)$$

(In these formulae, $M^{11}$ represents a lanthanoid element, scandium or yttrium, $X^{11}$s each independently represent hydrogen atom, halogen atom, alkoxide group, thiolate group, amide group, silyl group, aldehyde residue, ketone residue, carboxylic residue, thiocarboxylic residue or phosphorus compound residue, $L^{11}$ represents a Lewis base, and w represents an integer in the range of 0 to 3.)

Specific examples of a group (ligand) bonded to a rare earth element of the rare earth element compound include: hydrogen atom; aliphatic alkoxy group such as methoxy, ethoxy, propoxy, n-butoxy, isobutoxy, sec-butoxy, tert-butoxy, and the like; phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy; aliphatic thiolate group such as thiomethoxy, thioethoxy, thiopropoxy, thio-n-butoxy, thioisobutoxy, tio-sec-butoxy, thio-tert-butoxy, and the like; aryl thiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like; aliphatic amide group such as dimethylamido, diethylamide, dipropylamide, and the like; arylamide such as phenylamide, 2,6-di-tert-butylphenylamide, 2,6-diisopropylphenylamide, 2,6-dineopentylphenylamide, 2-tert-butyl-6-isopropylphenylamide, 2-tert-buty-6-neopentylphenylamide, 2-isopropyl-6-neopentylphenylamide, 2,4,6-tert-butylphenylamide, and the like; bistrialkylsilylamide such as bistrimethylsilylamide; silyl group such as trimethylsilyl, tris(trimethylsilyl)silyl, bis(trimethylsilyl)methylsilyl, trimethylsilyl(dimethyl)silyl, triisopropylsilyl(bistrimethylsilyl) silyl, and the like; a halogen atom such as fluorine, chlorine, bromine, Iodine atoms; and the like. Specific examples of the ligand further include: aldehyde residue such as salicylaldehyde, 2-hydroxy-1-naphthaldehyde, 2-hydroxy-3-naphthaldehyde, and the like; a residue of hydroxyphenone such as 2'-hydroxyacetophenone, 2'-hydroxybutylophenone, 2'-hydroxypropiophenone, and the like; a residue of diketone such as acetylacetone, benzoylacetone, propionylacetone, isobutylacetone, valeryl acetone, ethylacetylacetone, and the like; a residue of carboxylic acid such as isovaleric acid, caprylic acid, octanoic acid, lauric acid, myristic acid, palmitic acid, stearic acid, isostearic acid, oleic acid, linoleic acid, cyclopentanecarboxylic acid, naphthenic acid, ethylhexanoic acid, pivalic acid, versatic acid (a product manufactured by Shell Chemicals, which is a synthetic acid composed of a mixture of isomers of $C_{10}$ monocarboxylic acid), phenylacetic acid, benzoic acid, 2-naphthoic acid, maleic acid, succnic acid, and the like; a residue of thocarboxylic acid such as hexanethioic acid, 2,2-dimethylbutanethioic acid, decanethioic acid, thiobenzoic acid, and the like; a residue of phosphate ester such as dibutyl phosphate, dipentyl phosphate, dihexyl phosphate, diheptyl phosphate, dioctyl phosphate, bis(2-ethylhexyl) phosphate, bis(1-methylheptyl) phosphate, dilauryl phosphate, dioleoyl phosphate, diphenyl phosphate, bis(p-nonylphenyl) phosphate, bis (polyethylene glycol-p-nonylphenyl) phosphate, (butyl)(2-ethylhexyl) phosphate, (1-methylheptyl)(2-ethylhexyl) phosphate, (2-ethylhexyl)(p-nonylphenyl) phosphate, and the like; a residue of phosphonic ester such as monobutyl (2-ethylhexyl)phosphite, mono-2-ethylhexyl(2-ethylhexyl) phosphite, mono-2-ethylhexyl phenylphosphite, mono-p-nonylphenyl (2-ethylhexyl)phosphite, mono-2-ethylhexyl phosphite, mono-1-methylheptyl phosphite, mono-p-nonylphenyl phosphite, and the like; a residue of phosphinic acid such as dibutyl phophinic acid, bis(2-ethylhexyl)phosphinic acid, bis(1-methylheptyl)phosphinic acid, dilauryl phosphinic acid, dioleoyl phosphinic acid, diphenyl phosphinic acid, bis(p-nonylphenyl)phosphinic acid, butyl(2-ethylhexyl)phosphinic acid, (2-ethylhexyl)(1-methylheptyl)phosphinic acid, (2-ethylhexyl)(p-nonylphenyl)phosphinic acid, butyl phosphinic acid, 2-ethylhexyl phosphinic acid, 1-methylheptyl phosphinic acid, oleoyl phosphinic acid, lauryl phosphinic acid, phenyl phosphinic acid, p-nonylphenyl phosphinic acid, and the like. Either a single type or combination of two or more types of the aforementioned examples or the like may be used as the ligands.

In the component (A) for use in the first polymerization catalyst composition, examples of the Lewis base to be reacted with the rare earth element compound include tetrahydrofuran, diethyl ether, dimethylaniline, trimethylphosphine, lithium chloride, neutral olefins, neutral diolefins, and the like. In this connection, in a case where the rare earth element compound is reacted with a plurality of Lewis bases (i.e. in a case where w=2 or 3 in formula (XI) and formula (XII)), these Lewis bases $L^{11}$s may be of either the same type or the different types.

It is preferable that the rare earth element-containing compound contains a compound represented by formula (i) below.

$$M\text{-}(NQ^1)(NQ^2)(NQ^3) \qquad (i)$$

(In formula (i), M represents at least one selected from lanthanoid, scandium and yttrium; and $NQ^1$, $NQ^2$ and $NQ^3$ represent amide groups which may be of the same type or different types and each essentially include a M-N bond).

The compound represented by formula (i), characteristically having three M-N bonds, exhibits an advantage that the compound is structurally stable because of the chemically equivalent three bonds thereof and thus easy to handle.

In the formula (i), examples of the amide group represented by NQ include: aliphatic amide group such as dimethylamide, diethylamide, diisopropylamide; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-buty-6-neopentylphenylamide, 2-isopropyl-6-neopentylphenylamide, 2,4,6-tert-butylphenylamide, and the like; and bistrialkylsilylamide such as bistrimethylsilylamide. Bistrimethylsilylamide is preferable as the amide group among these examples.

The component (B) for use in the first polymerization catalyst composition is at least one type of compound selected from the group consisting of: an ionic compound (B-1); aluminoxane (B-2); and a halogen compound (B-3). The total content of the component (B) in the first polymerization catalyst composition is preferably ≥0.1 to 50 times as much as the content of the component (A) in the composition when compared in mol.

The ionic compound, referred to as (B-1) in the present invention, is constituted of a non-coordinating anion and a cation. Examples of the ionic compound (B-1) include an ionic compound capable of being reacted with the compound (A), i.e. a rare earth element compound or a reactant resulted from a reaction between the rare earth element compound and a Lewis base, to generate a cationic transition metal compound. In this connection, examples of the non-coordinating anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris(pentafluorophenyl)](phenyl)borate, tridecahydride-7,8-dicarbaundecaborate, and the like. Examples of the cation include carbonium cation, oxonium cation, ammonium cation, phosphonium cation, cycloheptatrienyl cation, ferroceium cation having transition metal, and the like. Specific examples of carbonium ion include trisubstituted carbonium cation such as triphenylcarbonium cation, tri(substituted phenyl)carbonium cation, and the like. Specific examples of the tri(substituted phenyl)carbonium cation include tri(m-ethylphenyl)carbonium cation, tri(dimethylphenyl)carbonium cation, and the like. Specific examples of the ammonium cation include: trialkylammonium cation such as trimethylammonium cation, triethylammonium cation, tripropylammonium cation, tributylammonium cation (e.g. tri(n-butyl)ammonium cation); N,N-dialkylanilinium cation such as N,N-dimethylanilinium cation, N,N-diethylanilinium cation, N,N-2,4,6-pentamethylanilinium cation, and the like; and dialkylammonium cation such as diisopropylammonium cation, dicyclohexylammonium cation, and the like. Specific examples of phosphonium cation include triarylphosphonium cation such as triphenylphosphonium cation, tri(methylphenyl)phosphonium cation, tri(dimethylphenyl)phosphonium cation, and the like. A compound as a combination of a non-coordinating anion and a cation selected from the aforementioned examples, respectively, is preferably used as the ionic compound (B-1). Specific examples of the ionic compound (B-1) include N,N-dimethylanilinium tetrakis(pentafluorophenyl)borate, triphenylcarbonium tetrakis(pentafluorophenyl)borate, and the like. Either a single type or combination of two or more types of the aforementioned examples may be used as the ionic compound (B-1). The content of the ionic component (B-1) in the first polymerization catalyst composition is preferably ≥0.1 to 10 times, more preferably approximately 1 times, as much as the content of the component (A) when compared in mol.

Aluminoxane, referred to as (B-2) in the present invention, is a compound obtained by bringing an organic aluminum compound into contact with a condensing agent. Examples of aluminoxane include a chain aluminoxane or a cyclic aluminoxane represented by general formula: (—Al(R')O—) and having repeating units (in the formula, R' represents a $C_{1-10}$ hydrocarbon group; some of the hydrocarbon groups may be substituted with halogen atom and/or alkoxy group; and polymerization degree of the repeating units is preferably ≥5 and more preferably ≥10). Specific examples of R' include methyl, ethyl, proplyl, isobutyl groups and the like. Methyl group is preferable as R' among these examples. Examples of the organic aluminum compound used as a raw material of aluminoxane include trialkylaluminum such as trimethylaluminum, triethylaluminum, triisobutylaluminum, and a mixture thereof. Trimethylaluminum is particularly preferable among these examples as the organic aluminum compound. An aluminoxane obtained by using a mixture of trimethylaluminum and tributylaluminum as the raw material can be suitably used, for example. Provided that "Al/M" represents an element ratio of the aluminum element Al of aluminoxane with respect to the rare earth element M constituting the component (A), the content of aluminoxane (B-2) in the first polymerization catalyst composition is preferably set such that the element ratio Al/M is in the range of 10 to 1000 approximately.

The halogen compound, referred to as (B-3) in the present invention, is at least one type of halogen compound selected from a Lewis acid, a complex compound of a metal halide and a Lewis base, and an organic compound containing an active halogen. The halogen compound (B-3) is, for example, capable of being reacted with the component (A), i.e. a rare earth element compound or a reactant resulted from a reaction between the rare earth element compound and a Lewis base, to generate a cationic transition metal compound, a halide transition metal compound, or a compound of which transition metal center is deficient in charge. The total content of the halogen compound (B-3) in the first polymerization catalyst composition is preferably ≥1 to 5 times as much as the content of the component (A) when compared in mol.

Examples of the Lewis acid which can be used in the present invention include a boron-containing halogen compound such as $B(C_6F_5)_3$, an aluminum-containing halogen compound such as $Al(C_6F_5)_3$, and a halogen compound containing a group III, IV, V, VI or VIII element in the periodic table. Preferable examples of the Lewis acid include aluminum halide and organic metal halide. Chlorine or bromine is preferable as the halogen element. Specific examples of the Lewis acid include methylaluminum dibromide, methylaluminum dichloride, ethylaluminum dibromide, ethylaluminum dichloride, butylaluminum dibromide, butylaluminum dichloride, dimethylaluminum bromide, dimethylaluminum chloride, diethylaluminum bromide, diethylaluminum chloride, dibutylaluminum bromide, dibutylaluminum chloride, methylaluminum sesquibromide, methylaluminum sesquichloride, ethylaluminum sesquibromide, ethylaluminum sesquichloride, dibutyltin dichloride, aluminum tribromide, antimony trichloride, antimony pentachloride, phosphorus trichloride, phosphorus pentachloride, tin tetrachloride, titanium tetrachloride, tungsten hexachloride, and the like. Diethylaluminum chloride, ethylaluminum sesquichloride, ethylaluminum dichloride, diethylaluminum bromide, ethylaluminum sesquibromide, and ethylaluminum dibromide are particularly preferable as the Lewis acid among these examples.

Examples of the metal halide which, together with a Lewis base, constitutes a complex compound include beryllium chloride, beryllium bromide, beryllium iodide, magnesium chloride, magnesium bromide, magnesium iodide, calcium chloride, calcium bromide, calcium iodide, barium chloride, barium bromide, barium iodide, zinc chloride, zinc bromide, zinc iodide, cadmium chloride, cadmium bromide, cadmium iodide, mercury chloride, mercury bromide, mercury iodide, manganese chloride, manganese bromide, manganese iodide, rhenium chloride, rhenium bromide, rhenium iodide, copper chloride, copper iodide, silver chloride, silver bromide, silver iodide, gold chloride, gold iodide, gold bromide, and the like. Magnesium chloride, calcium chloride, barium chloride, manganese chloride, zinc chloride, copper chloride are preferable as the metal halide among these examples. Magnesium chloride, manganese chloride, zinc chloride, copper chloride are particularly preferable.

Further, preferable examples of the Lewis base constituting, together with the metal halide, a complex compound include a phosphorus compound, a carbonyl compound, a nitrogen compound, an ether compound, alcohol, and the like. Specifically, acceptable examples of the Lewis base include tributyl phosphate, tris (2-ethylhexyl) phosphate, triphenyl phosphate, tricresyl phosphate, triethylphosphine, tributylphosphine, triphenylphosphine, diethylphosphinoethane, diphenylphosphinoethane, acetylacetone, benzoylacetone, propionitrileacetone, valerylacetone, ethylacetylacetone, methyl acetoacetate, ethyl acetoacetate, phenyl acetoacetate, dimethyl malonate, diethyl malonate, diphneyl malonate, acetic acid, octanoic acid, 2-ethyl-hexanoic acid, oleic acid, stearic acid, benzoic acid, naphthenic acid, versatic acid, triethylamine, N,N-dimethylacetoamide, tetrahydrofuran, diphenyl ether, 2-ethyl-hexyl alcohol, oleyl alcohol, stearyl alcohol, phenol, benzyl alcohol, 1-decanol, lauryl alcohol, and the like. Tris (2-ethylhexyl) phosphate, tricresyl phosphate, acetylacetone, 2-ethyl-hexanoic acid, versatic acid, 2-ethyl-hexyl alcohol, 1-decanol, lauryl alcohol are preferable as the Lewis base among these examples.

0.01 to 30 mol (preferably 0.5 to 10 mol) per 1 mol of the metal halide, of the aforementioned Lewis base, is reacted with the metal halide. Metals remaining in the polymer can be reduced by using a reactant obtained by this reaction between the metal halide and the Lewis base.

Examples of the organic compound containing active halogen, as the compound (B-3), include benzyl chloride and the like.

The component (C) for use in the first polymerization catalyst composition is an organic metal compound represented by the aforementioned formula (X):

$$YR^1_a R^2_b R^3_c \quad (X)$$

(In formula (X), Y represents a metal selected from the group 1, 2, 12 and 13 elements in the periodic table, $R^1$ and $R^2$ each represent a $C_{1-10}$ hydrocarbon group or a hydrogen atom and may be of either the same type or different types, $R^3$ represents a $C_{1-10}$ hydrocarbon group and may be of either the same type as or a different type from $R^1$ and $R^2$, a=1 and b=c=0 when Y is a metal selected from the group 1 elements in the periodic table, a=b=1 and c=0 when Y is a metal selected from the groups 2, 12 elements in the periodic table, and a=b=c=1 when Y is a metal selected from the group 13 elements in the periodic table.)

The component (C) is preferably an organic aluminum compound represented by general formula (Xa):

$$AlR^1 R^2 R^3 \quad (Xa)$$

(In formula (Xa), $R^1$ and $R^2$ each represent a $C_{1-10}$ hydrocarbon group or a hydrogen atom and may be of either the same type or different types, $R^3$ represents a $C_{1-10}$ hydrocarbon group and may be of either the same type as or a different type from $R^1$ and $R^2$.)

Examples of the organic aluminum compound represented by general formula (Xa) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum, ethylaluminum dihydride, n-propylaluminum dihydride, isobutylaluminum dihydride, and the like. Triethylaluminum, triisobutylaluminum, hydrogenated diethylaluminum and hydrogenated diisobutylaluminum are preferable as the organic aluminum compound among these examples. Either a single type or combination of two or more types of the aforementioned examples of the organic aluminum compound may be used as the compound (C). The content of the organic aluminum compound (B-3) in the first polymerization catalyst composition is preferably 1 to 50 times, more preferably approximately 10 times, as much as the content of the component (A) when compared in mol.

It is preferable that the additive D capable of serving as an anionic ligand is added to the polymer composition because the addition causes a good effect of successfully synthesizing synthetic polyisoprene having a higher cis-1,4 bond content of polyisoprene at a high yield.

Type of the additive D is not particularly restricted as long as the additive is exchangeable for the amide group of the component (A). The additive D preferably has one of OH, NH, SH groups.

Specific examples of the additive D as a compound having OH group include aliphatic alcohol, aromatic alcohol, and the like. Specific examples of aliphatic alcohol, aromatic alcohol include 2-ethyl-1-hexanol, dibutylhydroxytoluene, alkylated phenol, 4,4'-thiobis-(6-t-butyl-3-methylphenol), 4,4'-butylidenebis-(6-t-butyl-3-methylphenol), 2,2'-methylenebis-(4-methyl-6-t-butylphenol), 2,2'-methylenebis-(4-ethyl-6-t-butylphenol), 2,6-di-t-4-ethylphenol, 1,1,3-tris-(2-methyl-4-hydroxy-5-t-butylphenyl)butane, n-octadecyl-3-(4-hydroxy-3,5,-di-t-butylphenyl)propionate, tetrakis[methylene-3-(3,5-di-t-butyl-4-hydroxyphenyl)propionate]methane, dilaurylthiodipropionate, distearylthiodipropionate, dimyristylyl thiopropionate, and the like, with no restriction thereto. Examples of "hindered-phenol" compounds in this connection include triethylene glycol-bis[3-(3-t-butyl-5-methyl-4-hydroxyphenyl)propionate], 1,6-hexanediol-bis[3-(3,5-di-t-butyl-4-4-hydroxyphenyl)propionate], 2,4-bis-(n-octylthio)-6-(4-hydroxy-3,5-di-t-butylanilino)-1,3,5-triazine, pentaerythryl-tetrakis[3-(3,5-di-t-butyl-4-hydroxyphenyl)propionate], 2,2-thiodiethylene-bis[3-(3,5-di-t-butyl-4-hydroxyphenyl)propionate], octadecyl-3-(3,5-di-t-butyl-4-hydroxyphenyl)propionate, N,N'-hexamethylene-bis(3,5-di-t-butyl-4-hydroxy-hydrocinnamic amide), 3,5-t-butyl-4-hydroxybenzylphosphonate-diethyl ester, 1,3,5-trimethyl-2,4,6-tris(3,5-di-t-butyl-4-hydroxybenzyl)benzene, tris-(3,5-di-t-butyl-4-hydroxybenzyl)-isocyanurate, octylated diphenylamine, 2,4-bis[(octylthio)methyl]-o-cresol, and the like. Further, examples of "hydrazine" compounds in this connection include N,N'-bis[3-(3,5-di-t-butyl-4-hydroxyphenyl)propionyl]hydrazine.

Specific examples of the additive D having NH group include primary amines such as alkylamine, arylamine and secondary amines. Specific examples of the primary and secondary amines include dimethylamine, diethylamine, pyrrole, ethanolamine, diethanolamine, dicyclohexylamine, N,N'-dibenzylethylenediamine, bis(2-diphenylphosphinophenyl)amine, and the like.

Specific examples of the additive D having SH group include aliphatic thiol, aromatic thiol, and compounds represented by following general formulae (I) and (II).

(I)

(In formula (I), $R^1$, $R^2$ and $R^3$ each independently represent $-O-C_jH_{2j+1}$, $-(O-C_kH_{2k}-)_a-O-C_mH_{2m+1}$, or $-C_nH_{2n+1}$; at least one of $R^1$, $R^2$ and $R^3$ is $-(O-C_kH_{2k}-)_a-O-C_mH_{2m+1}$; j, m and n each independently represent an integer in the range of 0 to 12; k and a each independently represent an integer in the range of 1 to 12; and $R_4$ represents a $C_{1-12}$, normal/branched/cyclic, saturated/unsaturated alkylene, cycloalkylene, cycloalkylalkylene, cycloalkenylalkylene, alkenylene, cycloalkenylene, cycloalkylalkenylene, cycloalkenylalkenylene, arylene, or aralkylene group.) Specific examples of the compounds represented by general formula (I) include (3-mercaptopropyl)trimethoxysilane, (3-mercaptopropyl)triethoxysilane, (3-mercaptopropyl)methyldimethoxysilane, (mercaptomethyl)dimethylethoxysilane, (mercaptomethyl)dimethylethoxysilane, (mercaptomethyl)trimethoxysilane, and the like.

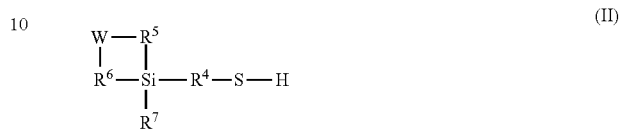
(II)

(In general formula (II), W represents $-NR^8-$, $-O-$, or $-CR^9R^{10}-$ ($R^8$ and $R^9$ each represent $-C_pH_{2p+1}$, $R^{10}$ represents $-C_qH_{2q+1}$, and p and q each independently represent an integer in the range of 0 to 20); $R^5$ and $R^6$ each independently represent $-M-C_rH_{2r}-$ (M represents $-O-$ or $-CH_2-$, r represents an integer in the range of 1 to 20); $R^7$ represents $-O-C_lH_{2j+1}$, $-(O-C_kH_{2k}-)_a-O-C_mH_{2m+1}$, or $-C_nH_{2n+1}$; j, m and n each independently represent an integer in the range of 0 to 12; k and a each independently represent an integer in the range of 1 to 12; and $R_4$ represents a $C_{1-12}$, normal/branched/cyclic, saturated/unsaturated alkylene, cycloalkylene, cycloalkylalkylene, cycloalkenylalkylene, alkenylene, cycloalkenylene, cycloalkylalkenylene, cycloalkenylalkenylene, arylene, or aralkylene group.) Specific examples of the compounds represented by general formula (II) include 3-mercaptopropyl(ethoxy)-1,3-dioxa-6-methylaza-2-silacyclooctane, 3-mercaptopropyl(ethoxy)-1,3-dioxa-6-butylaza-2-silacyclooctane, 3-mercaptopropyl(ethoxy)-1,3-dioxa-6-dodecylaza-2-silacyclooctane, and the like.

An anionic tridentate ligand precursor represented by following general formula (ii) can be preferably used as the additive D.

$$E^1\text{-}T^1\text{-}X\text{-}T^2\text{-}E^2 \quad (ii)$$

(In general formula (ii), X represents an anionic electron donor group containing a ligand atom selected from the group 15 elements in the periodic table; $E^1$ and $E^2$ each independently represent a neutral electron donor group containing a ligand atom selected from the group 15 and 16 elements in the periodic table; and $T^1$ and $T^2$ represent crosslinking groups crosslinking between X and $E^1$, $E^2$, respectively.)

The additive D is added by preferably ≥0.01 to 10 mol, more preferably ≥0.1 to 1.2 mol, per 1 mol of the rare earth element compound. When the additive D is added by less than 0.1 mol per 1 mol of the rare earth element compound, polymerization of the monomers may not proceed in a satisfactory manner, which possibly makes it difficult to achieve the object of the present invention. Adding the additive D by an amount chemically equivalent to the rare earth element compound (1.0 mol) is particularly preferable and the amount may exceed 1.0 mol. Adding the additive D by an amount exceeding 1.2 mol per 1 mol of the rare earth element compound, however, is not recommendable because then too much reagents will be wasted.

The neutral electron donor groups $E^1$ and $E^2$ in general formula (ii) are groups each containing a ligand atom selected from the group 15 and 16 elements in the periodic table. $E^1$ and $E^2$ may be of either the same group or different groups. Examples of the ligand atom include nitrogen N, phosphorus P, oxygen O, sulfur S and the like. The ligand atom is preferably phosphorus P.

In a case where the ligand atom contained in $E^1$ and $E^2$ is phosphorus P, examples of the neutral electron donor groups $E^1$ and $E^2$ include: 1) diarylphosphino group such as diphenylphosphino and ditolylphosphino; 2) dialkylphosphino group such as dimethylphosphino, diethylphosphino; and 3) alkylarylphosphino group such as methylphenylphosphino. The neutral electron donor group $E^1$ and $E^2$ is preferably diarylphosphino group.

In a case where the ligand atom contained in $E^1$ and $E^2$ is nitrogen N, examples of the neutral electron donor groups $E^1$ and $E^2$ include: 1) dialkylamino group such as dimethylamino, diethylamino, and bis(trimethylsilyl)amino; 2) diarylamino group such as diphenylamino; and 3) alkylarylamino group such as methylphenyl.

In a case where the ligand atom contained in $E^1$ and $E^2$ is oxygen O, examples of the neutral electron donor groups $E^1$ and $E^2$ include: 1) alkoxy group such as methoxy, ethoxy, propoxy, butoxy; and 2) aryloxy group such as phenoxy and 2,6-dimethylphenoxy.

In a case where the ligand atom contained in $E^1$ and $E^2$ is sulfur S, examples of the neutral electron donor groups $E^1$ and $E^2$ include: 1) alkylthio group such as methylthio, ethylthio, propylthio, butylthio; and 2) arylthio group such as phenylthio and tolylthio.

The anionic electron donor group X is a group containing a ligand atom selected from the group 15 elements in the periodic table. The ligand atom is preferably phosphorus P or nitrogen N and more preferably nitrogen N.

The crosslinking groups $T^1$ and $T^2$ may be any groups as long as they can crosslink between X and $E^1$, $E^2$, respectively. Examples of the crosslinking groups $T^1$ and $T^2$ include arylene group which may have a substituent group on the aryl ring thereof. The crosslinking groups $T^1$ and $T^2$ may be of either the same group or different groups.

Acceptable examples of the arylene group include phenylene, naphthylene, pyridylene, thienylene (preferably phenylene, naphthylene). The arylene group may have a substituent group on the aryl ring thereof. Examples of the substituent group include: alkyl group such as methyl, ethyl; aryl group such as phenyl, tolyl; halogen group such as fluoro, chloro, bromo; silyl group such as trimethylsilyl; and the like. Particularly preferable example of the arylene group include 1,2-phenylene.

Thee anionic tridentate ligand precursor in the metal complex constituting the polymerization catalyst can be manufactured with reference to, for example, "Organometallics", 23 (2004), pp. 4778-4787, and specific examples thereof include bis(2-diphenylphosphinophenyl)amine (PNP) ligand.

—Second Polymerization Catalyst Composition—

Next, the second polymerization catalyst composition will be described.

The second polymerization catalyst composition is a polymerization catalyst composition containing at least one type of complex selected from the group consisting of:

a metallocene complex represented by following general formula (III)

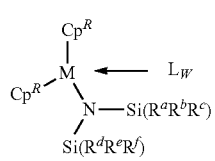

(III)

(In formula (III), M represents lanthanoid, scandium or yttrium; $Cp^R$s each independently represent unsubstituted/substituted indenyl; $R^a$ to $R^f$ each independently represent a $C_{1-3}$ alkyl group or hydrogen atom; L represents a neutral Lewis base; and w represents an integer in the range of 0 to 3);

a metallocene complex represented by following general formula (IV)

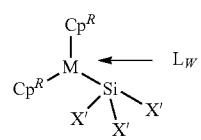

(IV)

(In formula (IV), M represents lanthanoid, scandium or yttrium; $Cp^R$s each independently represent unsubstituted/substituted indenyl; X' represents hydrogen atom, halogen atom, alkoxide, thiolate, amido, silyl, or a $C_{1-20}$ hydrocarbon group; L represents a neutral Lewis base; and w represents an integer in the range of 0 to 3); and a half metallocene cation complex represented by following general formula (V)

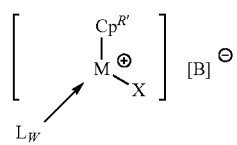

(V)

(In formula (V), M represents a lanthanoid element, scandium or yttrium; $Cp^{R'}$ represents unsubstituted/substituted cyclopentadienyl, indenyl or fluorenyl; X represents hydrogen atom, halogen atom, alkoxide, thiolate, amido, silyl, or a $C_{1-20}$ hydrocarbon group; L represents a neutral Lewis base; and w represents an integer in the range of 0 to 3); and [B]⁻ represents a non-coordinating anion).

The second polymerization catalyst composition may further include other components included in a conventional metallocene complex-containing polymer catalyst composition, e.g. a prompter. In the present invention, a "metallocene complex" represents a complex compound in which at least one cyclopentadienyl or derivative thereof is bonded to a core metal. In this connection, a metallocene complex in which only a single cyclopentadienyl or derivative thereof is bonded to a core metal may occasionally be referred to as a "half metallocene complex" in particular. The concentration of the complex contained in the second polymerization catalyst composition is preferably in the range of 0.1 mol/L to 0.0001 mol/L in the polymerization reaction system.

$Cp^R$s are unsubstituted/substituted indenyls in the metallocene complexes represented by general formula (III) and general formula (IV). $Cp^R$ having an indenyl ring as the base skeleton may be represented as $C_9H_{7-X}R_X$ or $C_9H_{11-X}R_X$, wherein X is an integer in the range of 0 to 7 or 0 to 11; Rs preferably each represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like. Specific examples of the substituted indenyl include 2-phenylindenyl, 2-methylindenyl, and the like. $Cp^R$s in general formula (III) and general formula (IV) may be of either the same type or different types.

$Cp^{R'}$ is unsubstituted/substituted cyclopentadienyl, indenyl, fluorenyl group in the half metallocene cation complex represented by general formula (V). Unsubstituted/substituted indenyl group is preferable as $Cp^{R'}$ among these examples. $Cp^{R'}$ having a cyclopentadienyl ring as the base skeleton is represented as $C_5H_{5-X}R_X$, wherein X is an integer in the range of 0 to 5; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like. Specific examples of $Cp^{R'}$ having a cyclopentadienyl ring as the base skeleton include compounds represented by the following structural formulae:

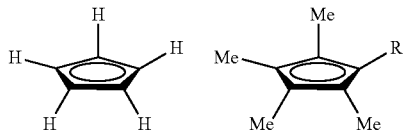

(In these structural formulae, R represents hydrogen atom, methyl or ethyl group.) $Cp^{R'}$ having an indenyl ring as the base skeleton, as well as preferable examples thereof, in general formula (V) is defined in the same manner as $Cp^R$ in general formula (III).

$Cp^{R'}$ having a fluorenyl ring as the base skeleton in general formula (V) is represented as $C_{13}H_{9-X}R_X$ or $C_{13}H_{17-X}R_X$, wherein X is an integer in the range of 0 to 9 or 0 to 17; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like.

The core metal M in each of general formulae (III), (IV) and (V) is a lanthanoid element, scandium or yttrium. The lanthanoid elements include elements having atomic numbers 57-71 in the periodic table and any of these elements is acceptable. Preferable examples of the core metal M include samarium Sm, neodymium Nd, praseodymium Pr, gadolinium Gd, cerium Ce, holmium Ho, scandium Sc, and yttrium Y.

The metallocene complex represented by general formula (III) includes a silylamide ligand [—$N(SiR_3)_2$]. R groups included in the silylamide ligand (i.e. $R^a$ to $R^f$ in general formula (III)) each independently represent a $C_{1-3}$ alkyl group or a hydrogen atom. It is preferable that at least one of $R^a$ to $R^f$ is a hydrogen atom. The catalyst can be easily synthesized and a non-conjugated olefin is easily introduced due to relatively little hindrance around the silicon atom when at least one of $R^a$ to $R^f$ is a hydrogen atom. For similar reasons, it is more preferable that at least one of $R^a$ to $R^c$ is a hydrogen atom and at least one of $R^d$ to $R^f$ is a hydrogen atom. Methyl group is preferable as the alkyl group.

The metallocene complex represented by general formula (IV) includes a silyl ligand [—$SiX'_3$]. X' groups included in the silyl ligand [—$SiX'_3$], as well as preferable examples thereof, are defined in the same manner as X group in general formula (V) described below.

In general formula (V), X is a group selected from the group consisting of hydrogen atom, halogen atom, alkoxide, thiolate, amido, silyl, and a $C_{1-20}$ hydrocarbon groups. Examples of the alkoxide group include: aliphatic alkoxy group such as methoxy, ethoxy, propoxy, n-butoxy, isobutoxy, sec-butoxy, tert-butoxy, and the like; and aryloxide group such as phenoxy, 2,6-di-tert-butylphenoxy, 2,6-diisopropylphenoxy, 2,6-dineopentylphenoxy, 2-tert-butyl-6-isopropylphenoxy, 2-tert-butyl-6-neopentylphenoxy, 2-isopropyl-6-neopentylphenoxy, and the like. 2,6-di-tert-butylphenoxy is preferable as the alkoxide group among these examples.

Examples of the thiolate group represented by X in general formula (V) include: aliphatic thiolate group such as thiomethoxy, thioethoxy, thiopropoxy, n-thiobutoxy, thoisobutoxy, sec-thiobutoxy, tert-thiobutoxy, and the like; and arylthiolate group such as thiophenoxy, 2,6-di-tert-butylthiophenoxy, 2,6-diisopropylthiophenoxy, 2,6-dineopentylthiophenoxy, 2-tert-butyl-6-isopropylthiophenoxy, 2-tert-butyl-6-thioneopentylphenoxy, 2-isopropyl-6-thioneopentylphenoxy, 2,4,6-triisopropylthiophenoxy, and the like. 2,4,6-triisopropylthiophenoxy is preferable as the thiolate group among these examples.

Examples of the amide group represented by X in general formula (V) include: aliphatic amide group such as dimethylamide, diethylamide, diisopropylamide, and the like; arylamide group such as phenylamide, 2,6-di-tert-butylphenylamide, 2,6-diisopropylphenylamide, 2,6-dineopentylphenylamide, 2-tert-butyl-6-isopropylphenylamide, 2-tert-butyl-6-neopentylphenylamide, 2-isopropyl-6-neopentylphenylamide, 2,4,6-tri-tert-butylphenylamide, and the like; and bis(trialkylsily)lamide such as bis(trimethylsilyl)amide and the like. Bis(trimethylsilyl)amide is preferable as the amide group among these examples.

Examples of the silyl group represented by X in general formula (V) include trimethylsilyl, tris(trimethylsilyl)silyl, bis(trimethylsilyl)methylsilyl, trimethylsilyl(dimethyl)silyl, (triisopropylsilyl)bis(trimethylsilyl)silyl, and the like. Tris(trimethylsilyl)silyl is preferable as the silyl group among these examples.

Acceptable examples of the halogen atom represented by X in general formula (V) include fluorine, chlorine, bromine and iodine atoms. Chlorine or bromine atom is preferable. Specific examples of the $C_{1-20}$ hydrocarbon group represented by X in general formula (V) include: normal/branched aliphatic hydrocarbon group such as methyl, ethyl, n-propyl, isopropyl, n-butyl, isobutyl, sec-butyl, tert-butyl, neopentyl, hexyl, octyl; aromatic hydrocarbon group such as phenyl, tolyl, naphthyl; aralykyl group such as benzyl; a hydrocarbon group containing silicon atom such as trimethylsilylmethyl, bis(trimethylsilyl)methyl; and the like. Methyl, ethyl, isopropyl, trimethylsilylmethyl, and the like are preferable as the $C_{1-20}$ hydrocarbon group among these examples.

Bistrimethylsilylamide or a $C_{1-20}$ hydrocarbon group is preferable as X in general formula (V).

Examples of the non-coordinating anion represented by [B]$^-$ in general formula (V) include quadrivalent boron anion. Specific examples of the quadrivalent boron anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris(pentafluorophenyl)phenyl]borate, tridecahydride-7,8-dicarbaundecaborate, and the like. Tetrakis(pentafluorophenyl)borate is preferable as the quadrivalent boron anion among these examples.

The metallocene complexes represented by general formulae (III) and (IV) and the half metallocene cation complex represented by general formula (V) each further include 0 to 3, preferably ≥0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

The metallocene complexes represented by general formulae (III) and (IV) and the half metallocene cation complex represented by general formula (V) may each exist as any of monomer, dimer or another type of multimer.

The metallocene complex represented by general formulae (III) can be obtained by, for example, reacting lanthanoid trishalide, scandium trishalide or yttrium trishalide with an indenyl salt (such as potassium or lithium indenyl salt) and a bis(trialkylsilyl)amido salt (such as potassium or lithium salt of bis(trialkylsilyl)amido) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallecene complex represented by general formula (III) is shown below.

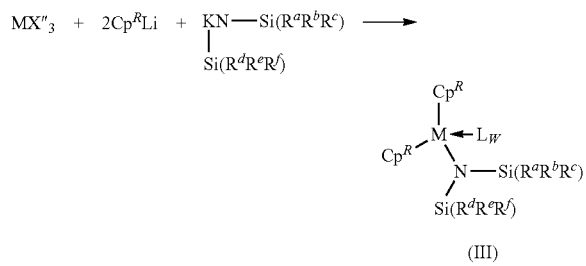

(In the reaction example above, X'' represents a halide.)

The metallocene complex represented by general formulae (IV) can be obtained by, for example, reacting lanthanoid trishalide, scandium trishalide or yttrium trishalide with an indenyl salt (such as potassium or lithium indenyl salt) and a silyl salt (such as potassium or lithium silyl salt) in a solvent. The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene can be used. An example of a reaction for obtaining the metallecene complex represented by general formula (IV) is shown below.

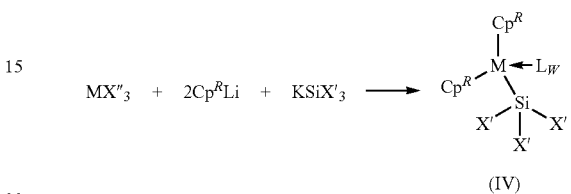

(In the reaction example above, X'' represents a halide.)

The half metallocene cation complex represented by general formulae (V) can be obtained, for example, by a reaction shown below.

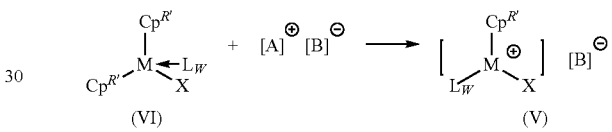

In the compound represented by general formula (IV), M represents a lanthanoid element, scandium or yttrium; $Cp^{R'}$'s each independently represent unsubstituted/substituted cyclopentadienyl, indenyl or fluorenyl; and X represents hydrogen atom, halogen atom, alkoxide, thiolate, amido, silyl, or a $C_{1-20}$ hydrocarbon group. L represents a neutral Lewis base and w represents an integer in the range of 0 to 3. [A]$^+$ represents a cation and [B]$^-$ represents a non-coordinating anion in an ionic compound represented by [A]$^+$[B]$^-$.

Examples of the cation represented by [A]$^+$ include carbonium cation, oxonium cation, amine cation, phosphonium cation, cycloheptatrienyl cation, ferrocenium cation having transition metal, and the like. Examples of the carbonium cation include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation. Examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation; and dialkylammonium cation such as diisopropylammonium cation, dicyclohexylammonium cation, and the like. Examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation or carbonium cation is preferable and N,N-dialkylanilinium cation is particularly preferable as [A]$^+$ among these examples.

The ionic compound represented by general formula [A]$^+$[B]$^-$ for use in the aforementioned reaction is, for example, a compound obtained by combining a non-coordinating anion and a cation respectively selected from the aforementioned examples and preferably N,N-dimethylanilinium tetrakis(pentafluorophenyl)borate, triphenylcarbonium tetrakis(pentafluorophenyl)borate, and the like. The ionic compound represented by general formula $[A]^+[B]^-$ is added to the metallocene complex by an amount preferably 0.1 to 10 times, more preferably approximately 1 times, as much as the amount of the metallocene complex. In the case where the half metallocene cation complex represented by general formula (V) is used for a polymerization reaction, the half metallocene cation complex represented by general formula (V) may be directly provided into a polymerization reaction system or, alternatively, the half metallocene cation complex represented by general formula (V) may be formed in a polymerization reaction system by providing a compound represented by general formula (IV) and the ionic compound represented by general formula $[A]^+[B]^-$ for use in the aforementioned reaction, respectively, in the polymerization reaction system. Further alternatively, the half metallocene cation complex represented by general formula (V) may be formed in a polymerization reaction system by using the metallocene complex represented by general formula (III) or general formula (IV) and the ionic compound represented by general formula $[A]^+[B]^-$ for use in the aforementioned reaction in a combined manner in the polymerization reaction system.

Structures of the metallocene complex represented by general formula (III) or general formula (IV) and the half metallocene cation complex represented by general formula (V) are each preferably determined through x-ray structural analysis.

The prompter applicable to the second polymerization catalyst composition can be selected according to necessity from components used as prompters in a conventional polymerization catalyst composition containing a metallocene complex. Preferable examples of the prompter include aluminoxane, an organic aluminum compound, the ionic compounds described above, and the like. Either a single type or combination of two or more types of these examples may be used as the prompter.

The aforementioned aluminoxane is preferably alkylaluminoxane and examples thereof include methylaluminoxane (MAO), modified methylaluminoxane, and the like. "MMAO-3A", manufactured by Tosoh Finechem Corporation, or the like is preferable as the modified methylaluminoxane. Provided that "Al/M" represents an element ratio of the aluminum element Al of the aluminoxane with respect to the core metal M of the metallocene complex, the content of the aluminoxane in the second polymerization catalyst composition is set such that the element ratio Al/M is in the range of 10 to 1000 approximately, preferably around 100.

On the other hand, the aforementioned organic aluminum compound is preferably an organic aluminum compound represented by general formula AlRR'R" (in the formula, R and R' each independently represent a $C_{1-10}$ hydrocarbon group or a hydrogen atom and R" represents a $C_{1-10}$ hydrocarbon group). Examples of the organic aluminum compound include trialkylaluminum, dialkylaluminum chloride, alkylaluminum dichloride, dialkylaluminum hydride, and the like. Trialkylaluminum is preferable as the organic aluminum compound among these examples. Examples of trialkylaluminum include triethylaluminum, triisobutylaluminum, and the like. The content of the organic aluminum compound in the second polymerization catalyst composition is preferably ≥1 to 50 times, more preferably around 10 times, as much as the content of the metallocene complex in the composition when compared in mol.

The cis-1,4 bond content and/or the molecular weight of a resulting polymer can be increased by using each of the metallocene complex represented by general formula (III) or general formula (IV) and the half metallocene cation complex represented by general formula (V) with an appropriate prompter in combination in the second polymerization catalyst composition.

—Third Polymerization Catalyst Composition—

Next, the third polymerization catalyst composition will be described.

The third polymerization catalyst composition is a compound containing a rare earth element and examples thereof include a metallocene-based composite catalyst represented by the following formula (A):

$$R_aMX_bQY_b \quad (A)$$

(In formula (A), Rs each independently represent unsubstituted/substituted indenyl; M is coordinated with Rs; M represents a lanthanoid element, scandium or yttrium; Xs each independently represent a $C_{1-20}$ hydrocarbon group; M and Q are μ-coordinated with X; Q represents a group 13 element in the periodic table; Ys each independently represent a $C_{1-20}$ hydrocarbon group or a hydrogen atom; Q is coordinated with Y; and a=b=2).

Preferable examples of the metallocene-based composite catalyst represented by formula (A) include a metallocene-based composite catalyst represented by the following formula (XV):

(XV)

(In formula (XV), $M^1$ represents a lanthanoid element, scandium or yttrium; $Cp^R$s each independently represent unsubstituted/substituted indenyl; $R^A$ and $R^B$ each independently represent a $C_{1-20}$ hydrocarbon group; $M^1$ and Al are μ-coordinated with $R^A$ and $R^B$; and $R^C$ and $R^D$ each independently represent a $C_{1-20}$ hydrocarbon group or a hydrogen atom.)

A targeted polymer can be manufactured by using the metallocene-based polymerization catalyst described above. Further, it is possible to reduce an amount of alkylaluminum for use in the polymer synthesis or even eliminate the alkylaluminum by using the metallocene-based composite catalyst described above, for example, a catalyst which has been combined with aluminum catalyst in advance to be a composite. It should be noted in this connection that a large amount of alkylaluminum is needed during the polymer synthesis if the conventional catalyst system is employed. For example, alkylaluminum must be used by an amount at least 10 times as much as the chemically equivalent amount of a relevant metal catalyst in the conventional catalyst system. In contrast, in the case of using the metallocene-based composite catalyst described above, a good catalytic effect is demonstrated by adding alkylaluminum by an amount around 5 times as much as the chemically equivalent amount of the metal catalyst.

With regard to the metallocene-based composite catalyst represented by formula (A), the metal M is a lanthanoid element, scandium or yttrium. The lanthanoid elements include the fifteen elements having atomic numbers 57-71 and any of these elements is acceptable. Preferable examples of the core metal M include samarium Sm, neodymium Nd, praseodymium Pr, gadolinium Gd, cerium Ce, holmium Ho, scandium Sc, and yttrium Y.

In formula (A), Rs each independently represent unsubstituted/substituted indenyl and M is coordinated with Rs. Specific examples of the substituted indenyl group include 1,2,3-trimethyl indenyl, heptamethylindenyl, 1,2,4,5,6,7-hexamethylindenyl, and the like.

In formula (A), Q represents a group 13 element in the periodic table and specific examples thereof include boron, aluminum, gallium, indium, thallium, and the like.

In formula (A), Xs each independently represent a $C_{1-20}$ hydrocarbon group and M and Q are μ-coordinated with X. Examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like. The expression that "M and Q are μ-coordinated with X" represents that M and Q are coordinated with X in a crosslinking manner.

In formula (A), Ys each independently represent a $C_{1-20}$ hydrocarbon group or a hydrogen atom and Q is coordinated with Y. In this connection, examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

In formula (XV), the metal $M^1$ is a lanthanoid element, scandium or yttrium. The lanthanoid elements include the fifteen elements having atomic numbers 57-71 and any of these elements is acceptable. Preferable examples of the core metal $M^1$ include samarium Sm, neodymium Nd, praseodymium Pr, gadolinium Gd, cerium Ce, holmium Ho, scandium Sc, and yttrium Y.

In formula (XV), $Cp^R$s are unsubstituted/substituted indenyls. $Cp^R$ having an indenyl ring as the base skeleton may be represented as $C_9H_{7X}R_X$ or $C_9H_{11X}R_X$, wherein X is an integer in the range of 0 to 7 or 0 to 11; Rs preferably each independently represent hydrocarbyl or metalloid group; and the number of carbon atoms of the hydrocarbyl group is preferably in the range of 1 to 20, more preferably in the range of 1 to 10, and further more preferably in the range of 1 to 8. Specifically, preferable examples of the hydrocarbyl group include methyl, ethyl, phenyl, benzyl groups and the like. Examples of metalloid of the metalloid group include germyl Ge, stannyl Sn, and silyl Si. The metalloid group preferably includes a hydrocarbyl group which is defined in the same manner as the aforementioned hydrocarbyl group. Specific examples of the metalloid group include trimethylsilyl and the like.

Specific examples of the substituted indenyl include 2-phenylindenyl, 2-methylindenyl, and the like. The two $Cp^R$s in general formula (XV) may be of either the same type or different types.

In formula (XV), $R^A$ and $R^B$ each independently represent a $C_{1-20}$ hydrocarbon group and $M^1$ and Al are μ-coordinated with $R^A$ and $R^B$. In this connection, examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like. The expression that "$M^1$ and Al are μ-coordinated with $R^A$ and $R^B$" represents that $M^1$ and Al are coordinated with $R^A$ and $R^B$ in a crosslinking manner.

In formula (XV), $R^C$ and $R^D$ each independently represent a $C_{1-20}$ hydrocarbon group or a hydrogen atom. In this connection, examples of the $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

The metallocene-based composite catalyst described above can be obtained by reacting a metallocene complex represented by the following formula (XVI) with an organic aluminum compound represented by $AlR^KR^LR^M$ in a solvent.

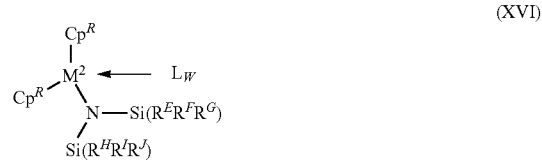

(XVI)

(In formula (XVI), $M^2$ represents a lanthanoid element, scandium or yttrium; $Cp^R$s each independently represent unsubstituted/substituted indenyl; $R^E$ to $R^J$ each independently represent a $C_{1-3}$ alkyl group or a hydrogen atom; L represents a neutral Lewis base; and w represents an integer in the range of 0 to 3).

The reaction temperature may be set around the room temperature, which allows production in a mild condition. The reaction time may be set as desired and is generally in the range of a few hours to a few days. Type of the reaction solvent is not particularly limited but preferably a solvent capable of dissolving the raw materials and a reaction product. For example, toluene or hexane can be used. The structure of the metallocene-based composite catalyst described above is preferably determined through $^1$H-NMR or x-ray structural analysis.

In the metallocene complex represented by formula (XVI), $Cp^R$s each independently represent unsubstituted/substituted indenyl and are defined in the same manner as $Cp^R$s in formula (XV); and the metal $M^2$ is a lanthanoid element, scandium or yttrium and defined in the same manner as the metal $M^1$ in formula (XV).

The metallocene complex represented by formula (XVI) includes a silylamide ligand [—$N(SiR_3)_2$]. R groups included in the silylamide ligand (i.e. $R^E$ to $R^J$ in general formula (XVI) each independently represent a $C_{1-3}$ alkyl group or a hydrogen atom. It is preferable that at least one of $R^E$ to $R^J$ is a hydrogen atom. The catalyst can be easily synthesized when at least one of $R^E$ to $R^J$ is a hydrogen atom. Methyl group is preferable as the alkyl group.

The metallocene complex represented by formula (XVI) further includes 0 to 3, preferably 0 to 1, neutral Lewis base L. Examples of the neutral Lewis base L include tetrahydrofuran, diethyl ether, dimethylaniline, trimethylphosphine, lithium chloride, neutral olefin, neutral diolefin, and the like. The neutral Lewis bases L may be of either the same type or different types when the complex includes a plurality of neutral Lewis bases L.

The metallocene complex represented by general formula (XVI) may exist as any of monomer, dimer or another type of multimer.

The organic aluminum compound for use in generation of the metallocene-based composite catalyst described above is represented by $AlR^KR^LR^M$, wherein $R^K$ and $R^L$ each independently represent a monovalent $C_{1-20}$ hydrocarbon group or a hydrogen atom; $R^M$ represents a monovalent $C_{1-20}$ hydrocarbon group; and $R^M$ may be of either the same type as or a different type from $R^K$ and $R^L$. Examples of the monovalent $C_{1-20}$ hydrocarbon group include methyl, ethyl, propyl, butyl, pentyl, hexyl, heptyl, octyl, decyl, dodecyl, tridecyl, tetradecyl, pentadecyl, hexadecyl, heptadecyl, stearyl, and the like.

Specific examples of the organic aluminum compound include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum; hydrogenated diethylaluminum, hydrogenated di-n-propylaluminum, hydrogenated di-n-butylaluminum, hydrogenated diisobutylaluminum, hydrogenated dihexylaluminum, hydrogenated diisohexylaluminum, hydrogenated dioctylaluminum, hydrogenated diisooctylaluminum; ethylaluminum dihydride, n-propylaluminum dihydride, isobutylaluminum dihydride, and the like. Triethylaluminum, triisobutylaluminum, hydrogenated diethylaluminum and hydrogenated diisobutylaluminum are preferable as the organic aluminum compound among these examples. Either a single type or combination of two or more types of these examples may be used as the organic aluminum compound. An amount of the organic aluminum compound for use in generation of the metallocene-based composite catalyst is preferably 1 to 50 times, more preferably approximately 10 times, as much as the amount of the metallocene complex when compared in mol.

The third polymerization catalyst composition is characteristically composed of the metallocene-based composite catalyst described above and a boron anion. Further, the third polymerization catalyst composition preferably also includes other components, e.g. a prompter, contained in a conventional polymerization catalyst composition containing a metallocene-based catalyst. A catalyst composed of the metallocene-based composite catalyst and a boron anion is occasionally referred to as a "two-component catalyst". It is possible to control contents of respective polymer components in a resulting polymer as desired by using the third polymerization catalyst composition because the third polymerization catalyst composition contains a boron anion, as well as the metallocene-based composite catalyst.

Specific examples of the boron anion constituting a two-component catalyst as the third polymerization catalyst composition include a quadrivalent boron anion. Examples of the quadrivalent boron anion include tetraphenylborate, tetrakis(monofluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(tetrafluoromethylphenyl)borate, tetra(tolyl)borate, tetra(xylyl)borate, triphenyl(pentafluorophenyl)borate, [tris(pentafluorophenyl)](phenyl)borate, tridecahydride-7,8-dicarbaundecaborate, and the like. Tetrakis(pentafluorophenyl)borate is preferable as the quadrivalent boron anion among these examples.

The boron anion can be used as an ionic compound in which the boron anion is combined with a cation. Examples of the cation include carbonium cation, oxonium cation, amine cation, phosphonium cation, cycloheptatrienyl cation, ferroceium cation having transition metal, and the like. Specific examples of carbonium ion include trisubstituted carbonium cation such as triphenylcarbonium cation, tri(substituted phenyl)carbonium cation, and the like. Specific examples of the tri(substituted phenyl)carbonium cation include tri(methylphenyl)carbonium cation, and the like. Specific examples of the amine cation include: trialkylammonium cation such as trimethylammonium cation, triethylammonium cation, tripropylammonium cation, tributylammonium cation; N,N-dialkylanilinium cation such as N,N-dimethylanilinium cation, N,N-diethylanilinium cation, N,N-2,4,6-pentamethylanilinium cation, and the like; and dialkylammonium cation such as diisopropylammonium cation, dicyclohexylammonium cation, and the like. Specific examples of phosphonium cation include triarylphosphonium cation such as triphenylphosphonium cation, tri(methylphenyl)phosphonium cation, tri(dimethylphenyl)phosphonium cation, and the like. N,N-dialkylanilinium cation and carbonium cation are preferable and N,N-dialkylanilinium cation is particularly preferable as the cation among these examples. Accordingly, N,N-dimethylanilinium tetrakis(pentafluorophenyl)borate, triphenylcarbonium tetrakis(pentafluorophenyl)borate, and the like are preferable as the ionic compound. The ionic compound composed of the boron anion and the cation is preferably added by an amount 0.1 to 10 times, more preferably approximately 1 times, as much as the amount of the metallocene-based composite catalyst when compared in mol.

It is necessary to use the metallocene-based composite catalyst and the boron anion in the third polymerization catalyst composition. However, the metallocene-based composite catalyst represented by formula (XV) cannot be synthesized when a boron anion exists in a reaction system for reacting a metallocene catalyst represented by formula (XVI) with an organic aluminum compound. Accordingly, preparation of the third polymerization catalyst composition requires synthesizing the metallocene-based composite catalyst in advance, isolating and purifying the metallocene-based composite catalyst thus synthesized, and then combining the metallocene-based composite catalyst with a boron anion.

Preferable examples of the prompter which may be used for the third polymerization catalyst composition include aluminoxane and the like, as well as the aforementioned organic aluminum compound represented by $AlR^{K}R^{L}R^{M}$. Alkylaluminoxane is preferable as the aluminoxane and examples thereof include methylaluminoxane (MAO), modified methylaluminoxane, and the like. "MMAO-3A", manufactured by Tosoh Finechem Corporation, or the like is preferable as the modified methylaluminoxane. Either a single type or combination of two or more types of these examples may be used as the aluminoxane.

—Coupling Process—

Coupling process is a process of carrying out a reaction (a coupling reaction) for modifying at least a portion, e.g. a terminal end, of a polymer chain constituting the polymer composition obtained by the first polymerization reaction method or the second polymerization reaction method of the present invention.

The coupling reaction of the coupling process is preferably carried out when the polymerization reaction is fully completed.

Type of a coupling agent for use in the coupling reaction is not particularly restricted and can be appropriately selected according to the purpose. Examples of the coupling agent include: (i) a tin-containing compound such as bis(maleic acid-1-octadecyl)dioctyl tin (IV); (ii) an isocyanate compound such as 4,4'-diphenylmethane diisocyanate; (iii) an alkoxysilane compound such as glycidyl propyltrimethoxysilane; and the like. Either a single type or combination of two or more types of these examples may be used as the coupling agent.

Bis(maleic acid-1-octadecyl)dioctyl tin (IV) is preferable as the coupling agent among these examples in terms of high reaction efficiency and relatively little gel generation. The number average molecular weight (Mn) can be increased as a result of carrying out the coupling reaction.

—Rinsing Process—

Rinsing process is a process of rinsing a polymer composition obtained by the aforementioned polymerization process. Type of a solvent for use in the rinsing process is not particularly restricted and can be appropriately selected according to the purpose. Examples of the solvent include methanol, ethanol, isopropanol, and the like. An acid (such as hydrochloric acid, sulfuric acid, nitric acid) may be added to such a solvent as described above when the solvent is used for a polymerization catalyst composition blended with a Lewis acid-derived catalyst in particular. An amount to be added, of the acid, is preferably 15 mol % or less with respect to the solvent. Addition of the acid by an amount exceeding 15 mol % with respect to the solvent may cause the acid to remain in polymer, possibly adversely affecting mixture, kneading and a vulcanization reaction. An amount of catalyst residue in polymer can be decreased to an appropriate level by the rinsing process.

(Rubber Member)

The rubber composition of the present invention includes at least a rubber component and optionally a filler, a crosslinking agent and other components.

—Rubber Component—

The rubber component includes at least the aforementioned polymer composite and optionally other rubber components.

The characteristics of the polymer composite have been explained in the foregoing descriptions.

The content of the polymer composition to be blended in the rubber component is not particularly restricted and can be appropriately selected according to the purpose but is preferably in the range of 15 mass % to 100 mass %.

The polymer can exhibit characteristics thereof in a satisfactory manner when the total content of the polymer composition blended in the rubber component is 15 mass %.

—Other Rubber Components—

Types of other rubber components are not particularly restricted and can be appropriately selected according to the purpose. Examples of other rubber components include polyisoprene, butadiene rubber (BR), styrene-butadiene rubber (SBR), acrylonitrile-butadiene rubber (NBR), chloroprene rubber, ethylene-propylene rubber (EPM), ethylene-propylene-nonconjugated diene rubber (EPDM), polysulfide rubber, silicone rubber, flurorubber, urethane rubber, and the like. Either a single type or combination of two or more types of these examples may be used as the other rubber components.

—Filler—

Type of a filler is not particularly restricted and can be appropriately selected according to the purpose. Examples of the filler include carbon black, inorganic filler, and the like. It is preferable that the rubber composition includes at least one type of the filler selected from carbon black and inorganic filler. It is more preferable that the rubber composition includes carbon black. Such a filler as described above is blended with the rubber composition for the purpose of improving reinforcing properties or the like.

The content of the filler blended in the rubber component is not particularly restricted and can be appropriately selected according to the purpose but is preferably in the range of 10 to 100 parts by mass, more preferably in the range of 20 to 80 parts by mass, and further more preferably in the range of 30 to 60 parts by mass, with respect to 100 parts by mass of the rubber component.

The filler may not effectively work when the content of the filler blended in the rubber component is less than 10 parts by mass. On the other hand, the content of the filler blended in the rubber component exceeding 100 parts by mass tends to disturb smooth mixture of the filler with the rubber component, thereby possibly deteriorating performances of the rubber composition.

—Carbon Black—

Type of the carbon black is not particularly restricted and can be appropriately selected according to the purpose. Examples of the carbon black include FEF, GPF, SRF, HAF, N339, IISAF, ISAF, SAF, and the like. Either a single type or combination of two or more types of these examples may be used as the carbon black.

The nitrogen adsorption specific surface area ($N_2SA$) measured according to JIS K 6217-2: 2001 of the carbon black is not particularly restricted and can be appropriately selected according to the purpose but is preferably in the range of 20 to 100 $m^2/g$ and more preferably in the range of 35 to 80 $m^2/g$.

The nitrogen adsorption specific surface area ($N_2SA$) of the carbon black <20 $m^2/g$ may deteriorate durability of a resulting rubber, thereby possibly making it impossible to obtain satisfactory crack growth resistance. The $N_2SA$ of the carbon black >100 $m^2/g$ deteriorates the low-hysteresis loss properties of a resulting rubber and may also possibly adversely affect the workability.

The content of the carbon black with respect to 100 parts by mass of the rubber component is not particularly restricted and can be appropriately selected according to the purpose but is preferably in the range of 10 to 100 parts by mass, more preferably in the range of 10 to 70 parts by mass, and further more preferably in the range of 20 to 60 parts by mass.

The content of the carbon black described above less than 10 parts by mass may result in the poor reinforcing properties and deteriorate fracture resistance of a resulting rubber. The content of the carbon black described above exceeding 100 parts by mass may deteriorate workability and low-hysteresis loss properties of a resulting product. In contrast, the content of the carbon black set to be within the aforementioned preferable range advantageously improves respective performances of a resulting product in a well-balanced manner.

—Inorganic Filler—

Type of the inorganic filler is not particularly restricted and can be appropriately selected according to the purpose. Examples of the inorganic filler include silica, aluminum hydroxide, clay, alumina, talc, mica, kaolin, glass balloons, glass beads, calcium carbonate, magnesium carbonate, magnesium hydroxide, calcium oxide (carbonate), magnesium oxide, titanium oxide, potassium titanate, barium sulfate, and the like. Either a single type or combination of two or more types of these examples may be used as the inorganic filler.

A silane coupling agent may be used in an appropriate manner when the inorganic filler is added.

—Crosslinking Agent—

Type of the crosslinking agent is not particularly restricted and can be appropriately selected according to the purpose. Examples of the crosslinking agent include sulfur-based crosslinking agent, organic peroxide-based crosslinking agent, inorganic crosslinking agent, polyamine crosslinking agent, resin crosslinking agent, sulfur compound-based crosslinking agent, oxime-nitrosamine-based crosslinking agent, sulfur, and the like. Sulfur-based crosslinking agent is preferably applied to a rubber composition for a tire among these examples.

The content of the crosslinking agent is not particularly restricted and can be appropriately selected according to the purpose but is preferably in the range of 0.1 to 20 parts by mass with respect to 100 parts by mass of the rubber component.

The content of the crosslinking agent described above less than 0.1 parts by mass may result in a situation where crosslinking hardly proceeds. The content of the crosslinking agent described above exceeding 20 parts by mass may cause a portion of the crosslinking agent to prematurely start crosslinking during mixing and kneading and/or adversely affect the physical properties of a resulting vulcanized product.

—Other Components—

Further, a vulcanization-accelerator may also be added to the rubber composition. Examples of the vulcanization-accelerator include a guanidine compound, an aldehyde-amine compound, an aldehyde-ammonium compound, a thiazole compound, a sulfenamide compound, a thiourea compound, a thiuram compound, dithiocarbamate compound, a xanthate compound, and the like.

Yet further, other known additives such as a softener, a vulcanization accelerator aid, a coloring agent, a fire retardant, a lubricant, a foaming agent, a plasticizer, a processing aid, an antioxidant, an antiaging agent, a scorch protection agent, a UV protection agent, an antistatic agent, an anti-coloring agent, and the like may optionally be used according to the purpose.

(Crosslinked Rubber Composition)

The rubber composition described above may be subjected to crosslinking, so that a resulting crosslinked rubber composition can be used.

Type of the crosslinked rubber composition is not particularly restricted and can be appropriately selected according to the purpose as long as the crosslinked rubber composition is obtained by crosslinking the rubber composition of the present invention. The crosslinking condition is not particularly restricted and can be appropriately selected according to the purpose. The crosslinking temperature is preferably in the range of 120° C. to 200° C. and the heating time is preferably in the range of 1 minute to 900 minutes.

(Tire)

Type of a tire of the present invention is not particularly restricted and can be appropriately selected according to the purpose as long as the tire uses the rubber composition or the crosslinked rubber composition of the present invention.

A portion of a tire to which the rubber composition or the crosslinked rubber composition of the present invention is to be applied is not particularly limited and the tire portion can be appropriately selected according to the purpose. Examples of the tire portion include a tread, a base tread, a sidewall, side reinforcing rubber, a bead filler, and the like.

Applying the rubber composition or the crosslinked rubber composition of the present invention to a tread, among these examples, is particularly advantageous in terms of achieving high durability of a tire.

The tire of the present invention can be manufactured by a conventional method. For example, a desired tire such as a pneumatic tire can be manufactured by: sequentially laminating members generally for use in tire production such as a carcass layer, a belt layer, a tread layer made of unvulcanized rubber composition and/or cords on a tire building drum; removing the drum, to obtain a green tire; and subjecting the green tire to heating and vulcanization according to the conventional method.

(Application Other than Tire)

The rubber composition or the crosslinked rubber composition of the present invention is applicable to, other than a tire, a rubber damper, quake-absorbing rubber, a belt (conveyor belt), rubber crawler, hoses of various types.

EXAMPLES

The present invention will be described further in detail by Examples below. The present invention, however, is not restricted by any means by these Examples.

Production Example 1: Method for Manufacturing Polymer a (Synthetic Polyisoprene)

7.35 µmol of tris[N,N-bis(trimethylsilyl)amide]gadolinium, i.e. Gd[N(SiMe$_3$)$_2$]$_3$, 7.35 µmol of bis(2-diphenylphosphinophenyl)amine, and 1.0 g of toluene were charged into a 1 L pressure-resistant glass reactor in a glovebox under nitrogen atmosphere. The mixture was left to stand for 30 minutes and then 1.84 mmol of triisobutylaluminum and 5.0 g of toluene were added to the mixture. The resulting mixture was left to stand for 30 minutes. 7.35 µmol of triphenylcarbonium tetrakis(pentafluorophenyl)borate [Ph$_3$C][B(C$_6$F$_5$)$_4$] was then added to the mixture and the resulting mixture was left to stand for 15 minutes. Thereafter, the reactor was removed from the glovebox, 164.7 g of cyclohexane and 65 g of isoprene were added to the mixture, and polymerization was allowed to proceed for 2 hours at 50° C. The reaction was stopped by adding 1 mL of 5 mass % isopropanol solution of 2,2'-methylene-bis(4-ethyl-6-t-butyl)phenol (NS-5) when the polymerization was completed. A large amount of methanol was added to isolate polymer and the polymer thus isolated was vacuum-dried at 70° C., whereby polymer A was obtained.

The yield of polymer A was 65 g.

Production Example 2: Method for Manufacturing Polymer Composition B (Mixture of Polyisoprene and Polystyrene)

9.43 µmol of tris[N,N-bis(trimethylsilyl)amide]gadolinium, i.e. Gd[N(SiMe$_3$)$_2$]$_3$, 9.43 µmol of bis(2-diphenylphosphinophenyl)amine, and 1.0 g of toluene were charged into a 1 L pressure-resistant glass reactor in a glovebox under nitrogen atmosphere. The mixture was left to stand for 30 minutes and then 1.41 mmol of triisobutylaluminum and 5.0 g of toluene were added to the mixture. The resulting mixture was left to stand for 30 minutes. 7.35 µmol of triphenylcarbonium tetrakis(pentafluorophenyl)borate [Ph$_3$C][B(C$_6$F$_5$)$_4$] was then added to the mixture and the resulting mixture was left to stand for 15 minutes. The reactor was then removed from the glovebox, 1.7 g of styrene was added to the mixture, and the resulting mixture was stirred for 30 minutes at 50° C. Thereafter, 163.0 g of cyclohexane and 65 g of isoprene were added to the mixture and polymerization was allowed to proceed for 2 hours at 50° C. The reaction was stopped by adding 1 mL of 5 mass % isopropanol solution of 2,2'-methylene-bis(4-ethyl-6-t-butyl)phenol (NS-5) when the polymerization was completed. A large amount of methanol was added to isolate polymer and the polymer thus isolated was vacuum-dried at 70° C., whereby polymer composition B was obtained. The yield of polymer composition B was 59 g.

Production Example 3: Method for Manufacturing Polymer Composition C (Mixture of Polyisoprene and Polystyrene)

9.43 µmol of tris[N,N-bis(trimethylsilyl)amide]gadolinium, i.e. Gd[N(SiMe$_3$)$_2$]$_3$, 9.43 µmol of bis(2-diphenylphosphinophenyl)amine, and 1.0 g of toluene were charged into a 1 L pressure-resistant glass reactor in a glovebox under nitrogen atmosphere. The mixture was left to stand for 30 minutes and then 1.41 mmol of triisobutylaluminum and 5.0 g of toluene were added to the mixture. The resulting mixture was left to stand for 30 minutes. 7.35 µmol of triphenylcarbonium tetrakis(pentafluorophenyl)borate [Ph$_3$C][B(C$_6$F$_5$)$_4$] was then added to the mixture and the resulting mixture was left to stand for 15 minutes. The reactor was then removed from the glovebox, 3.4 g of styrene was added to the mixture, and the resulting mixture was stirred for 30 minutes at 50° C. Thereafter, 161.4 g of cyclohexane and 65 g of isoprene were added to the mixture and polymerization was allowed to proceed for 2 hours at 50° C. The reaction was stopped by adding 1 mL of 5 mass % isopropanol solution of 2,2'-methylene-bis(4-ethyl-6-t-butyl)phenol (NS-5) when the polymerization was completed. A large amount of methanol was added to isolate polymer and the polymer thus isolated was vacuum-dried at 70° C., whereby polymer composition C was obtained. The yield of polymer composition C was 62 g.

Production Example 4: Method for Manufacturing Polymer Composition D (Mixture of Polyisoprene and Polybutadiene: An Application of the First Polymerization Reaction Method)

9.43 µmol of tris[N,N-bis(trimethylsilyl)amide]gadolinium, i.e. Gd[N(SiMe$_3$)$_2$]$_3$, 9.43 µmol of bis(2-diphenylphosphinophenyl)amine, and 1.0 g of toluene were charged into a 1 L pressure-resistant glass reactor in a glovebox under nitrogen atmosphere. The mixture was left to stand for 30 minutes and then 1.41 mmol of triisobutylaluminum and 5.0 g of toluene were added to the mixture. The resulting mixture was left to stand for 30 minutes. 7.35 μmol of triphenylcarbonium tetrakis(pentafluorophenyl)borate [Ph$_3$C][B(C$_6$F$_5$)$_4$] was then added to the mixture and the resulting mixture was left to stand for 15 minutes. The reactor was then removed from the glovebox, 1.7 g of 1,3-butadiene was added to the mixture, and the resulting mixture was stirred for 30 minutes at 50° C. Thereafter, 163.0 g of cyclohexane and 65 g of isoprene were added to the mixture and polymerization was allowed to proceed for 2 hours at 50° C. The reaction was stopped by adding 1 mL of 5 mass % isopropanol solution of 2,2'-methylene-bis(4-ethyl-6-t-butyl)phenol (NS-5) when the polymerization was completed. A large amount of methanol was added to isolate polymer and the polymer thus isolated was vacuum-dried at 70° C., whereby polymer composition D was obtained. The yield of polymer composition D was 61 g.

Production Example 5: Method for Manufacturing Polymer Composition E (Mixture of Polyisoprene and Polybutadiene: An Application of the First Polymerization Reaction Method)

9.43 μmol of tris[N,N-bis(trimethylsilyl)amide]gadolinium, i.e. Gd[N(SiMe$_3$)$_2$]$_3$, 9.43 μmol of bis(2-diphenylphosphinophenyl)amine, and 1.0 g of toluene were charged into a 1 L pressure-resistant glass reactor in a glovebox under nitrogen atmosphere. The mixture was left to stand for 30 minutes and then 1.41 mmol of triisobutylaluminum and 5.0 g of toluene were added to the mixture. The resulting mixture was left to stand for 30 minutes. 7.35 μmol of triphenylcarbonium tetrakis(pentafluorophenyl)borate [Ph$_3$C][B(C$_6$F$_5$)$_4$] was then added to the mixture and the resulting mixture was left to stand for 15 minutes. The reactor was then removed from the glovebox, 3.4 g of 1,3-butadiene was added to the mixture, and the resulting mixture was stirred for 30 minutes at 50° C. Thereafter, 161.4 g of cyclohexane and 65 g of isoprene were added to the mixture and polymerization was allowed to proceed for 2 hours at 50° C. The reaction was stopped by adding 1 mL of 5 mass % isopropanol solution of 2,2'-methylene-bis(4-ethyl-6-t-butyl)phenol (NS-5) when the polymerization was completed. A large amount of methanol was added to isolate polymer and the polymer thus isolated was vacuum-dried at 70° C., whereby polymer composition E was obtained. The yield of polymer composition E was 63 g.

Production Example 6: Method for Manufacturing Polymer Composition F (Mixture of Polyisoprene and Polybutadiene: An Application of the Second Polymerization Reaction Method)

9.43 μmol of tris[N,N-bis(trimethylsilyl)amide]gadolinium, i.e. Gd[N(SiMe$_3$)$_2$]$_3$, 9.43 μmol of bis(2-diphenylphosphinophenyl)amine, and 1.0 g of toluene were charged into a 1 L pressure-resistant glass reactor in a glovebox under nitrogen atmosphere. The mixture was left to stand for 30 minutes and then 1.41 mmol of triisobutylaluminum and 5.0 g of toluene were added to the mixture. The resulting mixture was left to stand for 30 minutes. 7.35 μmol of triphenylcarbonium tetrakis(pentafluorophenyl)borate [Ph$_3$C][B(C$_6$F$_5$)$_4$] was then added to the mixture and the resulting mixture was left to stand for 15 minutes. The reactor was then removed from the glovebox, 161.4 g of cyclohexane, 3.4 g of 1,3-butadiene, and 65 g of isoprene were added to the mixture, and polymerization was allowed to proceed for 2 hours at 50° C. The reaction was stopped by adding 1 mL of 5 mass % isopropanol solution of 2,2'-methylene-bis(4-ethyl-6-t-butyl)phenol (NS-5) when the polymerization was completed. A large amount of methanol was added to isolate polymer and the polymer thus isolated was vacuum-dried at 70° C., whereby polymer composition F was obtained. The yield of polymer composition F was 62 g.

Microstructure, number average molecular weight (Mn), molecular weight distribution (Mw/Mn), and glass transition temperature (Tg) were analyzed for each of polymer A and polymer compositions B-F thus obtained. The respective analysis results of polymer A and polymer compositions B-F are shown in Table 1.

(1) Microstructures (Cis-1,4 Bond Content) of Polymer A and Polymer Compositions B-F Microstructure (the cis-1,4 bond content) of each of polymer A and polymer compositions B-F thus obtained was determined by measuring transmittance spectra according to Fourier transform infrared spectroscopy (FT-IR). Specifically, a calculation value of the cis-1,4 bond content was determined for each of polymer A and polymer compositions B-F by: preparing cells containing carbon disulfide solutions of the respective polymer samples (concentrations were each 5 mg/mL) and a blank cell of the same cell type but containing only carbon disulfide; measuring transmittance spectrum of each polymer sample by FT-IR; calculating values of e, f, and g by using a determinant (i) shown below, $$\begin{pmatrix} 1.7455 & 0 & -0.0151 \\ -0.0454 & 0.4292 & -0.0129 \\ -0.007 & 0 & 0.3746 \end{pmatrix} \begin{pmatrix} \log_{10}(a/d) \\ \log_{10}(a/b) \\ \log_{10}(a/c) \end{pmatrix} = \begin{pmatrix} e \\ f \\ g \end{pmatrix} \quad \text{(i)}$$

(In the determinant (i), "a" represents a positive peak in the vicinity of 1130 cm$^{-1}$ of the transmittance spectrum according to Fourier transform infrared spectroscopy (FT-IR), "b" represents a negative (valley) peak in the vicinity of 967 cm$^{-1}$ of the transmittance spectrum, "c" represents a negative (valley) peak in the vicinity of 911 cm$^{-1}$ of the transmittance spectrum, and "d" represents a negative (valley) peak in the vicinity of 736 cm$^{-1}$ of the transmittance spectrum); and obtaining a calculation value of the cis-1,4 bond content of the polymer sample by using the values of e, f and g according to formula (ii) shown below.

Calculation value of the cis-1,4bond content of polyisoprene=$e/(e+f+g)\times100$ (ii)

(2) Number Average Molecular Weight (Mn) and Molecular Weight Distribution (Mw/Mn)

The number average molecular weight (Mn) relative to polystyrene standard reference and the molecular weight distribution (Mw/Mn) based thereon were determined for each of polymer A and polymer compositions B-F according to gel permeation chromatography [GPC: HLC-8121GPC/HT manufactured by Tosoh Corporation, column: GMH$_{HR}$-H(S)HT×2 manufactured by Tosoh Corporation, detector: a refractive index detector (RI)] relative to monodisperse polystyrene as a standard reference material. The measurement temperature was 40° C.

(3) Glass Transition Temperature

The glass transition temperature was measured for each of polymer A and polymer compositions B-F by: preparing a plate-like polymer sample for measurement of glass transition temperature (60 mm×10 mm×1 mm approximately) from the polymer/polymer composition; subjecting the plate-like polymer sample to a dynamic viscoelasticity test under the conditions of temperature increasing rate: 3° C./minute, frequency: 1 Hz; and determining the glass transition temperature of the adhesive resin composition (the polymer sample) based on a peak of tan δ thereof.

TABLE 1

| | Polymer A | Polymer composition B | Polymer composition C | Polymer composition D | Polymer composition E | Polymer composition F |
|---|---|---|---|---|---|---|
| Mn ($\times 10^3$) | 899 | 1224 | 1227 | 626 | 683 | 650 |
| Mw/Mn | 2.6 | 2.7 | 2.6 | 3.6 | 3.5 | 3.7 |
| Content of cis-1,4 bond (%) | 98.1 | 98.2 | 98.2 | 97.9 | 97.9 | 98.0 |
| Tg (° C.) | −60.71 | −60.47 | −60.17 | — | −61.83 | — |
| Content of added styrene (mol %) | — | 1.7 | 3.3 | — | — | — |
| Polymerization degree of styrene ($^1$HNMR) | — | 3 | 7 | — | — | — |
| Approximate calculation value of molecular weight of styrene | — | 310 | 730 | — | — | — |
| Content of added butadiene (mol %) | — | — | — | 3.1 | 6.2 | 6.0 |

<Method for Evaluating Rubber Composition>

Rubber compositions of Examples 1 to 13 and Comparative Examples 1, 2 were prepared according to the blending prescriptions shown in Table 2. These rubber compositions were subjected to vulcanization at 160° C. for 20 minutes, whereby respective crosslinked rubber composition samples were obtained. (1) Fracture resistance, (2) wear resistance, and (3) crack growth resistance (under constant stress) were measured, respectively, for each of the crosslinked rubber composition samples by the methods described below. The measurement results are shown in Table 2.

TABLE 2

| | Comp. EX. 1 | Comp. EX. 2 | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|---|
| Blending details of composition (parts by mass) | | | | | | | | | | | | | | | |
| Polymer A | 100 | 0 | 0 | 0 | 0 | 0 | 0 | 0 | 0 | 0 | 0 | 0 | 0 | 0 | 0 |
| Polymer composition B | 0 | 0 | 100 | 0 | 0 | 0 | 0 | 0 | 0 | 0 | 0 | 0 | 0 | 0 | 0 |
| Polymer composition C | 0 | 0 | 0 | 100 | 0 | 0 | 0 | 0 | 0 | 0 | 0 | 0 | 0 | 0 | 0 |
| Polymer composition D | 0 | 0 | 0 | 0 | 10 | 15 | 50 | 80 | 0 | 0 | 0 | 0 | 0 | 0 | 0 |
| Polymer composition E | 0 | 0 | 0 | 0 | 0 | 0 | 0 | 0 | 100 | 0 | 0 | 0 | 0 | 0 | 0 |
| Polymer composition F | 0 | 0 | 0 | 0 | 0 | 0 | 0 | 0 | 0 | 100 | 0 | 10 | 15 | 50 | 80 |
| Butadiene rubber BR01 (manufactured by JSR Corporation) | 0 | 100 | 0 | 0 | 90 | 85 | 50 | 20 | 0 | 0 | 100 | 90 | 85 | 50 | 20 |
| Stearic acid | 2 | 2 | 2 | 2 | 2 | 2 | 2 | 2 | 2 | 2 | 2 | 2 | 2 | 2 | 2 |
| Carbon black | 50 | 50 | 50 | 50 | 50 | 50 | 50 | 50 | 50 | 50 | 50 | 50 | 50 | 50 | 50 |
| Antiaging agent*1 | 1 | 1 | 1 | 1 | 1 | 1 | 1 | 1 | 1 | 1 | 1 | 1 | 1 | 1 | 1 |
| Zinc white | 3 | 3 | 3 | 3 | 3 | 3 | 3 | 3 | 3 | 3 | 3 | 3 | 3 | 3 | 3 |
| Vulcanization accelerator CZ-G*2 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| Vulcanization accelerator DM-P*3 | 0.2 | 0.2 | 0.2 | 0.2 | 0.2 | 0.2 | 0.2 | 0.2 | 0.2 | 0.2 | 0.2 | 0.2 | 0.2 | 0.2 | 0.2 |
| Sulfur | 1.4 | 1.4 | 1.4 | 1.4 | 1.4 | 1.4 | 1.4 | 1.4 | 1.4 | 1.4 | 1.4 | 1.4 | 1.4 | 1.4 | 1.4 |
| Physical properties of crosslinked rubber composition | | | | | | | | | | | | | | | |
| Fracture resistance (index) | 100 | 95 | 108 | 117 | 96 | 96 | 102 | 105 | 105 | 110 | 106 | 96 | 96 | 102 | 103 |
| Wear resistance (index) | 100 | 96 | 105 | 111 | 95 | 97 | 101 | 103 | 103 | 108 | 104 | 94 | 96 | 101 | 103 |
| Crack growth resistance (index) | 100 | 86 | 125 | 136 | 90 | 110 | 118 | 123 | 118 | 125 | 118 | 88 | 107 | 111 | 120 |

*1: N-(1,3-dimethylbutyl)-N'-p-phenylenediamine, "Nocrac 6c", manufactured by Ouchi Shinko Chemical Industrial Co., Ltd.
*2: N-cyclohexyl-2-benzothiazolysulfenamide, "Nocceler-CZ-G", manufactured by Ouchi Shinko Chemical Industrial Co., Ltd.
*3: Dibenzothiazyldisulfide, "Nocceler-DM-P", manufactured by Ouchi Shinko Chemical Industrial Co., Ltd.

(1) Fracture Resistance (Index)

Fracture resistance is evaluated by: carrying out a tensile test at the room temperature according to JIS K 6301-1995 to measure tensile strength (Tb) of each of the vulcanized rubber compositions; and expressing the tensile strength thus measured by an index value relative to the tensile strength of Comparative Example 1 being "100", as shown in Table 2. The larger index value represents the higher fracture resistance.

(2) Wear Resistance (Index)

Wear resistance is evaluated by: carrying out a DIN wear resistance test according to JIS-K6264-2:2005 by using a disc-like test piece (diameter: 16.2 mm, thickness: 6 mm) cut out from each of the respective vulcanized rubbers thus prepared; measuring a volume (mm$^3$) of wear after completing the DIN wear resistance test at the room temperature; calculating a reciprocal of the volume of wear; and expressing the reciprocal by an index value relative to the reciprocal of Comparative Example 1 being "100", as shown in Table 2. The larger index value represents the higher wear resistance.

(3) Crack Growth Resistance (Index) Under Constant Stress

Crack growth resistance is evaluated by: forming a crack (0.5 mm) at the center portion of a JIS No. 3 test piece cut out from each of the respective vulcanized rubbers; subjecting the test piece to fatigue repeatedly at the room temperature under constant 100% strain (strain is to be measured by a tensile test according to JIS K6251); counting the number of subjecting the test piece to fatigue before the test piece is broken; and expressing the number thus counted by an index value relative to the number of Comparative Example 1 being "100", as shown in Table 2. The larger index value represents the higher crack growth resistance.

It is understood from Table 2 that crosslinked rubber compositions each having significantly improved durability (fracture resistance, wear resistance, and crack growth resistance), as compared with the conventional synthetic polyisoprene (polymer A) and butadiene rubber, can be obtained in Examples 1 to 13, i.e. the vulcanized rubber compositions using the polymer compositions B to F according to the present invention.

INDUSTRIAL APPLICABILITY

The polymer composition and the rubber composition containing the polymer composition of the present invention is suitably applicable to a tire structural member (a tread member of a tire in particular), for example.

The invention claimed is:

1. A method for manufacturing a polymer composition including a mixture of polyisoprene and polystyrene/polybutadiene, comprising:
   polymerizing styrene monomer or butadiene monomer in the presence of a catalyst to synthesize polystyrene or polybutadiene;
   adding isoprene monomer to the polystyrene or polybutadiene thus synthesized, to synthesize polyisoprene and thus generate said mixture,
   wherein the content of the styrene monomer is set to be in the range of 1.7 mol % to 3.3 mol % with respect to the total quantity of the styrene monomer and the isoprene monomer, and
   wherein the content of the butadiene monomer is set to be in the range of 3.1 mol % to 6.2 mol % with respect to the total quantity of the butadiene monomer and the isoprene monomer.

2. The method for manufacturing a polymer composition of claim 1, wherein said mixture is a mixture of polyisoprene and polystyrene.

3. The method for manufacturing a polymer composition of claim 2, wherein the number of styrene monomer units per one polystyrene molecule is equal to or less than 10.

4. The method for manufacturing a polymer composition of claim 2, wherein the number average molecular weight per one polystyrene molecule is equal to or less than 1000.

5. The method for manufacturing a polymer composition of claim 1, wherein said mixture is a mixture of polyisoprene and polybutadiene.

6. A method for manufacturing a polymer composition including a mixture of polyisoprene and polybutadiene, comprising:
   polymerizing butadiene monomer and isoprene monomer in the presence of a catalyst to generate said mixture,
   wherein the butadiene monomer and the isoprene monomer are added such that content of the butadiene monomer is in the range of 3.1 mol % to 6.2 mol % with respect to the total quantity of the butadiene monomer and the isoprene monomer.

7. The method for manufacturing a polymer composition of claim 1, wherein the cis-1,4 bond content of polyisoprene is equal to or more than 95%.

8. The method for manufacturing a polymer composition of claim 1, wherein the catalyst contains a rare earth element compound represented by formula (i) below:

$$M\text{-}(NQ^1)(NQ^2)(NQ^3) \tag{i}$$

wherein in formula (i), M represents at least one selected from lanthanoid, scandium and yttrium; and $NQ^1$, $NQ^2$ and $NQ^3$ represent amide groups which may be of the same type or different types and each essentially include a M-N bond.

9. The method for manufacturing a polymer composition of claim 8, further comprising an additive D which can serve as an anionic ligand.

10. A polymer composition, manufactured by the method of claim 1.

11. A rubber composition including a rubber component, wherein the rubber component contains the polymer composition of claim 10 by an amount of at least 50 parts by mass with respect to 100 parts by mass of the rubber component.

12. A tire, having a rubber member using the rubber composition of claim 11.

* * * * *